United States Patent
Pu et al.

(10) Patent No.: US 9,955,157 B2
(45) Date of Patent: Apr. 24, 2018

(54) ADVANCED PALETTE PREDICTION AND SIGNALING

(71) Applicant: QUALCOMM Incorporated, San Diego, CA (US)

(72) Inventors: Wei Pu, San Diego, CA (US); Feng Zou, San Diego, CA (US); Marta Karczewicz, San Diego, CA (US); Rajan Laxman Joshi, San Diego, CA (US); Vadim Seregin, San Diego, CA (US); Joel Sole Rojals, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 14/795,734

(22) Filed: Jul. 9, 2015

(65) Prior Publication Data
US 2016/0014407 A1    Jan. 14, 2016

Related U.S. Application Data

(60) Provisional application No. 62/023,436, filed on Jul. 11, 2014.

(51) Int. Cl.
*H04N 19/103* (2014.01)
*H04N 19/105* (2014.01)
(Continued)

(52) U.S. Cl.
CPC ......... *H04N 19/105* (2014.11); *H04N 19/159* (2014.11); *H04N 19/167* (2014.11); *H04N 19/176* (2014.11); *H04N 19/182* (2014.11); *H04N 19/186* (2014.11); *H04N 19/513* (2014.11); *H04N 19/56* (2014.11); *H04N 19/593* (2014.11); *H04N 19/70* (2014.11); *H04N 19/90* (2014.11)

(58) Field of Classification Search
CPC ..................................................... H04N 19/70
See application file for complete search history.

(56) References Cited

U.S. PATENT DOCUMENTS 9,544,607 B2    1/2017 Lai et al.
2003/0169932 A1    9/2003 Li et al.
(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
(Continued)

*Primary Examiner* — David N Werner
*Assistant Examiner* — Berteau Joisil
(74) *Attorney, Agent, or Firm* — Shumaker & Sieffert, P.A.

(57) ABSTRACT

A video coder may determine a palette predictor list comprising one or more candidates. Each respective candidate in the palette predictor list specifies a value of a different respective reconstructed neighboring pixel from among one or more reconstructed neighboring pixels. Each of the one or more reconstructed neighboring pixels is in a line above or a column left of a current block of the video data. The video coder may include, in a palette for the current block, at least one candidate in the palette predictor list.

24 Claims, 13 Drawing Sheets

(51) Int. Cl.
H04N 19/159    (2014.01)
H04N 19/167    (2014.01)
H04N 19/176    (2014.01)
H04N 19/182    (2014.01)
H04N 19/186    (2014.01)
H04N 19/513    (2014.01)
H04N 19/56     (2014.01)
H04N 19/70     (2014.01)
H04N 19/593    (2014.01)
H04N 19/90     (2014.01)

(56) References Cited

U.S. PATENT DOCUMENTS

| | | | |
|---|---|---|---|
| 2008/0130750 | A1 | 6/2008 | Song |
| 2014/0301475 | A1 | 10/2014 | Guo et al. |
| 2015/0016501 | A1 | 1/2015 | Guo et al. |
| 2015/0110181 | A1 | 4/2015 | Saxena et al. |
| 2015/0146976 | A1 | 5/2015 | Ma et al. |
| 2015/0373325 | A1* | 12/2015 | Karczewicz ......... H04N 19/593 375/240.13 |
| 2016/0309183 | A1* | 10/2016 | Sun ..................... H04N 19/593 |
| 2017/0127086 | A1* | 5/2017 | Lai ..................... H04N 19/597 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Gisquet, et al., "SCCE3: Test A.3—Palette Stuffing", JCT-VC Meeting; Jun. 30-Jul. 9, 2014; Sapporo; (Joint Collaborative Team on Video Coding of ISO/IEC JTC1/SC29/WG11 and ITU-T 5G.16); URL: http://wftp3.itu.int/av-archoctvc-site/,, No. JCTVC-R0082, Jun. 20, 2014, XP030116334, 5 pp.

Jin, et al., "Non-RCE4: Palette prediction for palette coding", JCT-VC Meeting; Jan. 9-17, 2014; San Jose; (Joint Collaborative Team on Video Coding of ISO/IEC JTC1/SC29/WG11 and ITU-T SG.16 ); URL: http://wftp3.itu.int/av-arch/jcivc-site/,, No. JCTVC-P0160, Jan. 4, 2014, XP030115679, 15 pp.

Xiu, et al., "Description of Screen Content Coding Technology Proposal by Inter Digital", JCT-VC Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jcivc-site/, No. JCTVC-Q0037, Mar. 18, 2014, XP030115927, 30 pp.

Zhu, et al., "Non-SCCE3: Modified Escaped Pixel Mode in Palette based Coding", JCT-VC Meeting; Jun. 30-Jul. 9, 2014; Sapporo; (Joint Collaborative Team on Video Coding of ISO/IEC JTC1/SC29/WG11 and ITU-T 50.16 ); URL: http://wftp3.itu.int/av-arch/jcivc-site/,, No. JCTVC-R0080-v2, Jul. 2, 2014, XP030116331, 10 slides.

Zhu et al., "Palette-Based Compound Image Compression in HEVC by Exploiting Non-Local Spatial Correlation," IEEE International Conference on Acoustic, Speech and Signal Processing (ICASSP), 2014, pp. 7398-7402.

Gisquet, et al., "AhG10: palette predictor stuffing," JCT-VC Meeting; Mar. 27-Apr. 4, 2014; Sapporo; (Joint Collaborative Team on Video Coding of ISO/IEC JTC1/SC29/WG11 and ITU-T 50.16); No. JCTVC-Q0063; Mar. 17, 2014; 3 pp.

Gisquet, et al., "AhG10: palette predictor stuffing," JCT-VC Meeting; Mar. 27-Apr. 4, 2014; Sapporo; (Joint Collaborative Team on Video Coding of ISO/IEC JTC1/SC29/WG11 and ITU-T 50.16); No. JCTVC-Q0063; 6 slides.

Karczewicz, et al., "SCCE3: Test A.8—Improvements on Palette Prediction Vector Signaling," JCT-VC Meeting; Jun. 30-Jul. 9, 2014; (Joint Collaborative Team on Video Coding of ISO/IEC JTC1/SC29/WG11 and ITU-T 50.16); No. JCTVC-R0063; Jun. 21, 2014; 3 pp.

"Text specification for palette mode used as a basis in screen content coding core experiment 3 (SCCE3)" Jun. 20, 2014; No. JCTVC-R0063; 11 pp.

Response to Second Written Opinion dated Jun. 10, 2016, from International Application No. PCT/US2015/039904, filed on Jul. 22, 2016, 22 pp.

"Text specification for palette mode used as a basis in screen content coding core experiment 3 (SCCE3)" Jun. 10, 2014; No. JCTVC-R0082; 11 pp.

Pu, et al., "SCCE3 base Software Bugfix Report," JCT-VC Meeting; Jun. 30-Jul. 9, 2014; (Joint Collaborative Team on Video Coding of ISO/IEC JTC1/SC29/WG11 and ITU-T 50.16); Jun. 30, 2014; No. JCTVC-R0306; 3 pp.

Pu, et al., "SCCE3 base Software Bugfix Report," JCT-VC Meeting; Jun. 30-Jul. 9, 2014; (Joint Collaborative Team on Video Coding of ISO/IEC JTC1/SC29/WG11 and ITU-T 50.16); Jun. 30, 2014; No. JCTVC-R0306; 4 slides.

"Text specification for palette mode used as a basis in screen content coding core experiment 3 (SCCE3)," No. JCTVC-R0306; Jun. 17, 2014; 10 pp.

(56) References Cited

OTHER PUBLICATIONS

International Search Report and Written Opinion from International Application No. PCT/2015/039904, dated Oct. 7, 2015, 13 pp.
Response to Written Opinion dated Oct. 7, 2015, from International Application No. PCT/2015/039904, filed on Jan. 6, 2016, 6 pp.
Second Written Opinion from International Application No. PCT/US2015/039904, dated Jun. 10, 2016, 6 pp.
Response to Second Written Opinion dated Jun. 10, 2017, from International Application No. PCT/2015/039904, filed on Jul. 22, 2016, 24 pp.
Response to email Communication dated Jul. 25, 2016 regarding renumbering of claims, from International Application No. PCT/2015/039904, filed on Aug. 8, 2016, 20 pp.
International Preliminary Report on Patentability, from International Application No. PCT/2015/039904, dated Sep. 12, 2016, 40 pp.

\* cited by examiner

ADVANCED PALETTE PREDICTION AND SIGNALING

The application claims the benefit of U.S. Provisional Patent Application 62/023,436, filed Jul. 11, 2014, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In general, this disclosure describes techniques for palette mode coding of video data. As described herein, a video coder may determine a palette predictor list that includes one or more candidate entries. Each of the candidate entries may specify at least one sample value of a different, respective reconstructed pixel neighboring a current block. The video coder may include one or more candidate entries of the palette predictor list in a palette of the current block.

In one example, this disclosure describes a method of decoding video data, the method comprising: determining a palette predictor list comprising one or more candidates, each respective candidate in the palette predictor list specifying at least one sample value of a different respective reconstructed neighboring pixel from among one or more reconstructed neighboring pixels, wherein each of the one or more reconstructed neighboring pixels is adjacent to a current block of the video data; including, in a palette for the current block, at least one candidate in the palette predictor list; obtaining, based on one or more syntax elements signaled in a bitstream, an index value for a pixel of the current block; identifying a palette entry in the palette that corresponds to the index value for the pixel; and determining, based on the at least one sample value specified by the identified palette entry, at least one reconstructed sample value of the pixel.

In another example, this disclosure describes a method of encoding video data, the method comprising: determining a palette predictor list comprising one or more candidates, each respective candidate in the palette predictor list specifying at least one sample value of a different respective reconstructed neighboring pixel from among one or more reconstructed neighboring pixels, wherein each of the one or more reconstructed neighboring pixels is in a line above or a column left of a current block of the video data; including, in a palette for the current block, at least one candidate in the palette predictor list; and signaling, in a bitstream, one or more syntax elements indicating an index value for a pixel of the current block, the index value corresponding to an entry in the palette.

In another example, this disclosure describes a device configured to code video data, the device comprising: a memory configured to store the video data; and one or more processors configured to: determine a palette predictor list comprising one or more candidates, each respective candidate in the palette predictor list specifying at least one sample value of a different respective reconstructed neighboring pixel from among one or more reconstructed neighboring pixels, wherein each of the one or more reconstructed neighboring pixels is in a line above or a column left of a current block of the video data; and include, in a palette for the current block, at least one candidate in the palette predictor list.

In another example, this disclosure describes a device configured to decode video data, the device comprising: means for determining a palette predictor list comprising one or more candidates, each respective candidate in the palette predictor list specifying at least one sample value of a different respective reconstructed neighboring pixel from among one or more reconstructed neighboring pixels, wherein each of the one or more reconstructed neighboring pixels is in a line above or a column left of a current block of the video data; and means for including, in a palette for the current block, at least one candidate in the palette predictor list.

In another example, this disclosure describes a data storage medium having instructions stored thereon that when executed cause a device for coding video data to: determine a palette predictor list comprising one or more candidates, each respective candidate in the palette predictor list specifying at least one sample value of a different respective reconstructed neighboring pixel from among one or more reconstructed neighboring pixels, wherein each of the one or more reconstructed neighboring pixels is in a line above or a column left of a current block of the video data; and include, in a palette for the current block, at least one candidate in the palette predictor list.

The details of one or more examples of the disclosure are set forth in the accompanying drawings and the description below. Other features, objects, and advantages will be apparent from the description, drawings, and claims.

DETAILED DESCRIPTION

Figure 1:
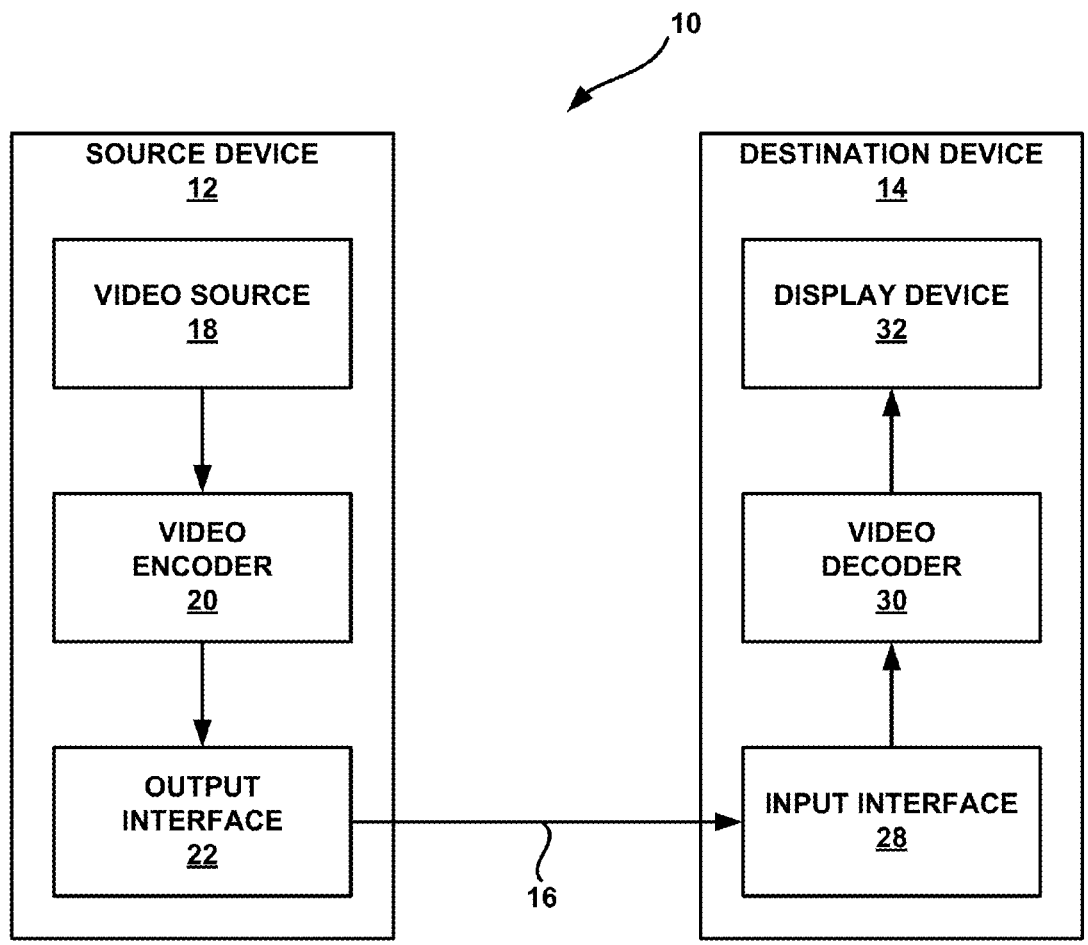
FIG. 1 is a block diagram illustrating an example video coding system that may utilize the techniques described in this disclosure.

Aspects of this disclosure are directed to techniques for video coding and video data compression. In particular, this disclosure describes techniques for palette-based coding of video data. In traditional video coding, images are assumed to be continuous-tone and spatially smooth. Based on these assumptions, various tools have been developed such as block-based transform, filtering, and other coding tools and such tools have shown good performance for natural content videos.

However, in applications like remote desktop, collaborative work and wireless display, computer generated screen content may be the dominant content to be compressed. This type of content tends to have discrete tones, sharp lines, and high contrast object boundaries. The assumption of continuous-tone and smoothness may no longer apply, and thus, traditional video coding techniques may be inefficient in compressing the content.

This disclosure describes palette-based coding, which may be particularly suitable for screen content coding or other content where one or more traditional coding tools are inefficient. Palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In palette mode coding, a palette includes or consists of entries numbered by an index representing color component values, which can be used as predictor for block samples or as final reconstructed block samples. Each entry in the palette may contain one color component (for example, a luma value) or two components (for example, two chroma values) or a triplet of three color components (for example, RGB, YUV, or components of other color spaces). Four or more color components might also be used in other situations, such as with four-component color spaces like "CMYK."

A block of video data may be coded by indicating, for each sample of the block, an index to a corresponding entry in the palette. Further efficiency is achieved by indicating runs of indexes to the same entry in the palette instead of individually signaling indexes. Samples in the palette mode block may be coded using run-length coding with run-modes, e.g., 'copy-left' (which may also be referred to herein as 'index-copy'), and 'copy-above.'

To reduce bits used to signal a palette, entries in the palette are predicted using previously decoded palette entries. The previous decoded palette entries (after pruning out duplicate entries) form a list, referred to as a palette predictor list. For each entry in the palette predictor list, one bin is used to indicate whether the corresponding entry is re-used in the current palette or not. These bins may form a binary vector. This vector corresponds to the syntax elements of previous_palette_entry_flag[i].

In the decoder, after decoding all of the previous_palette_entry_flag, the entries in the palette predictor list whose corresponding previous_palette_entry_flag equals to 1 are placed at the beginning of the current block's palette. In other words, the current palette can be logically divided into two zones. The first zone (named as ZONE_P hereafter, placed at the beginning) is composed of re-used entries from the palette predictor list. The second zone (named as ZONE_T hereafter, placed after the first zone) is composed of new palette entries, which are not in the palette predictor list and directly signaled in the bitstream.

The palette predictor list does not include so-called "escape pixels" used in a previously-coded block. Escape pixels are pixels present in a palette-coded block, but not included in the palette for the block. There may be an elevated probability the escape pixels of the previously coded block are also used in the current block, especially if those escape pixels are adjacent to the current block. Hence, it may be advantageous to include at least some of the escape pixels of the previously-coded block in the palette predictor list for the current block.

This disclosure describes techniques using neighboring reconstructed pixels, such as pixels from the line above a current block and the line to the left of the current block as additional candidate palette predictors to predict the current block's palette. For example, a video coder may use neighboring reconstructed pixels to construct another palette prediction list, referred to herein as the "extra palette predictor list." A video coder may use pixels in the "extra palette predictor list" in the same way the video coder would use other pixels in a palette. For instance, the bitstream may include an index to an entry in the "extra palette predictor list" to indicate that a corresponding pixel of a current block has the sample value specified by the entry.

Therefore, in accordance with an example of this disclosure, a video coder may determine a palette predictor list comprising or consisting of one or more candidates. In this example, each respective candidate in the palette predictor list specifies at least one sample value of a different respective reconstructed neighboring pixel from among one or more reconstructed neighboring pixels. Furthermore, in this example, each of the one or more reconstructed neighboring pixels is in a line above or a column left of a current block of the video data. For example, the neighboring pixels may be adjacent to the current block. In some examples, the neighboring pixels may come from the above row or two or more rows above the current block. The neighboring pixels may also come from the left column or left two or more columns of the current block. In this example, the video coder includes, in a palette for the current block, at least one candidate in the palette predictor list.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. Decoding denotes reconstructing sample values from encoded video data.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, video conferencing devices, or other types of media-enabled devices.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data (e.g., video data) is retrieved from a local memory, streamed over a network, or the like. A video encoding device may encode and store data (e.g., video data) to memory, and/or a video decoding device may retrieve and decode data (e.g., video data) from memory. In many examples, the encoding and decoding is performed by devices that do not communicate with one another, but simply encode data (e.g., video data) to memory and/or retrieve and decode data (e.g., video data) from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data from channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video compression standard, such as HEVC. A version of the HEVC, referred to as "HEVC Version 1" hereinafter, is available from https://www.itu.int/rec/dologin_pub.asp?lang=e&id=T-REC-H.265-201304-S!!PDF-E&type=items. In addition to HEVC Version 1, there are ongoing efforts to produce scalable video coding, multiview video coding, and 3D coding extensions for HEVC. In addition, palette-based coding modes, e.g., as described in this disclosure, may be provided for extension of HEVC. In some examples, the techniques described in this disclosure for palette-based coding may be applied to encoders and decoders configured to operate according to other video coding standards, such as the ITU-T-H.264/AVC standard or future standards. Accordingly, application of a palette-based coding mode for coding of coding units (CUs) or prediction units (PUs) in an HEVC codec is described for purposes of example.

Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block.

Video encoder 20 may use intra prediction or inter prediction to generate the predictive blocks for a PU. Predictive blocks may also be referred to as "predictive sample blocks." If video encoder 20 uses intra prediction to generate the predictive blocks of a PU, video encoder 20 may generate the predictive blocks of the PU based on decoded samples of the picture associated with the PU. In this disclosure, "based on" may, in some instances, be interpreted as "based at least in part on."

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector. When video encoder 20 uses bi-prediction to generate the predictive blocks for a PU, the PU may have two motion vectors.

After video encoder 20 generates predictive blocks (e.g., predictive luma, Cb and Cr blocks) for one or more PUs of a CU, video encoder 20 may generate a residual block for the CU. Each sample in the residual block indicates a difference between a sample in one of the CU's predictive blocks and a corresponding sample in one of the CU's original coding blocks. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may correspond to a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block to generate a coefficient block for the TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream. The bitstream may also include syntax elements that are not entropy encoded.

Video encoder 20 may output a bitstream that includes the entropy-encoded syntax elements. The bitstream may include a sequence of bits that forms a representation of coded pictures and associated data. In other words, the bitstream may comprise an encoded representation of video data. The bitstream may comprise a sequence of network abstraction layer (NAL) units. Each of the NAL units includes a NAL unit header and encapsulates a raw byte sequence payload (RBSP). The NAL unit header may include a syntax element indicating a NAL unit type code. The NAL unit type code specified by the NAL unit header of a NAL unit indicates the type of the NAL unit. A RBSP is a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. NAL units encapsulating RBSPs for video coding data (as opposed to RBSPs for parameter sets and SEI messages) may be referred to as video coding layer (VCL) NAL units. SEI may contain (e.g., consist of) information that is not necessary to decode the samples of coded pictures from VCL NAL units. An SEI RBSP may contain one or more SEI messages.

A VPS is a syntax structure comprising syntax elements applying to zero or more entire coded video sequences (CVSs). A sequence parameter set (SPS) is also a syntax structure comprising syntax elements applying to zero or more entire CVSs. An SPS may include a syntax element identifying a VPS active when the SPS is active. Thus, the syntax elements of a VPS may be more generally applicable than the syntax elements of an SPS. A picture parameter set (PPS) is a syntax structure comprising syntax elements applying to zero or more coded pictures. A PPS may include a syntax element identifying an SPS active when the PPS is active. A slice header of a slice may include a syntax element that indicates a PPS active when the slice is being coded.

Video decoder 30 may receive a bitstream generated by video encoder 20. In addition, video decoder 30 may parse the bitstream to obtain (e.g., decode) syntax elements from the bitstream. Video decoder 30 may reconstruct the pictures of the video data based at least in part on the syntax elements decoded from the bitstream. The process to reconstruct the video data may be generally reciprocal to the process performed by video encoder 20.

For instance, video decoder 30 may use motion vectors of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette-based coding, video encoder 20 and video decoder 30 may code a so-called palette as a table of colors for representing the video data of the particular area (e.g., a given block). Each pixel may be associated with an entry in the palette that represents at least one sample of the pixel. For example, video encoder 20 and video decoder 30 may code an index for a pixel identifying a palette entry specifying one or more samples of the pixel. In some examples, a "pixel value" is a single sample value of a single color component (e.g., luma, Cb, Cr). In other examples, a "pixel value" is a plurality of sample values (e.g., a luma sample value, a Cb sample value, and a Cr sample value).

Video encoder 20 may signal palette-related syntax elements at a CU level. For instance, if a CU is encoded using palette mode, the CU may include one or more palette_coding_component syntax structures. A syntax of the palette_coding_component syntax structure is reproduced in Table 1, below.

TABLE 1

| palette_coding_component( x0, y0, CbWidth, CbHeight, NumComp ) { | Descriptor |
|---|---|
|   compOffset = ( NumComp = = 3 ) ? 0 : ( NumComp − 1 ) | |
|   nCbS = ( 1 << log2CbSize ) | |
|   numPredPreviousPalette = 0 | |
|   for( i = 0; i < previousPaletteSize; i++ ) { | |
|     previous_palette_entry_flag[ i ] | ae(v) |
|     if ( previous_palette_entry_flag[ i ] ) { | |
|       for ( cIdx = compOffset; cIdx < NumComp + compOffset; cIdx++ ) | |
|         palette_entries[ cIdx ][ numPredPreviousPalette ] = | |
|           previousPaletteEntries[ cIdx ][ i ] | |
|       numPredPreviousPalette++ | |
|     } | |
|   } | |
|   if( numPredPreviousPalette < max_palette_size) | |
|     palette_num_signalled_entries | ae(v) |
|   for ( cIdx = compOffset; cIdx < NumComp + compOffset; cIdx++ ) | |
|     for( i = 0; i < palette_num_signalled_entries; i++ ) | |
|       palette_entries[ cIdx ][ numPredPreviousPalette + i ] | ae(v) |
|   palette_size = numPredPreviousPalette + palette_num_signalled_entries | |
|   previous_run_type_flag = INDEX_MODE | |
|   scanPos = 0 | |
|   while( scanPos < nCbS * nCbS ) { | |
|     xC = scanPos % nCbS | |
|     yC = scanPos / nCbS | |
|     if ( yC != 0 && previous_run_type_flag != COPY_ABOVE_MODE ) | |
|       palette_run_type_flag[ xC ][ yC ] | ae(v) |
|     else | |
|       palette_run_type_flag[ xC ][ yC ] = INDEX_MODE | |
|     previous_run_type_flag = palette_run_type_flag[ xC ][ yC ] | |
|     if( palette_run_type_flag[ xC ][ yC ] = = INDEX_MODE ) { | |
|       palette_index | ae(v) |
|       if( palette_index = = palette_size ) { /* ESCAPE_PIXEL */ | |
|         scanPos++ | |
|         for( cIdx = compOffset; cIdx < NumComp + compOffset; cIdx++ ) { | |
|           palette_escape_val | ae(v) |
|           samples_array[ cIdx ][ xC ][ yC ] = palette_escape_val | |
|         } | |
|       } | |
|     } | |
|     if( palette_run_type_flag[ xC ][ yC ] = = COPY_ABOVE_MODE || | |
|       ( palette_run_type_flag[ xC ][ yC ] = = INDEX_MODE && | |
|       palette_index < palette_size ) ) { | |
|       palette_run | ae(v) |
|       runPos = 0 | |
|       while ( runPos <= palette_run ) { | |
|         if( palette_run_type_flag[ xC ][ yC ] = = INDEX_MODE ) | |
|           paletteMap[ xC ][ yC ] = palette_index | |
|         else | |
|           paletteMap[ xC ][ yC ] = paletteMap[ xC ][ yC − 1 ] | |
|         for( cIdx = compOffset; cIdx < NumComp + compOffset; cIdx++ ) | |
|           samples_array[ cIdx ][ xC ][ yC ] = | |
|           palette_entries[ cIdx ][ paletteMap[ xC ][ yC ]] | |
|         runPos++ | |
|         scanPos++ | |
|         xC = scanPos % nCbS | |
|         yC = scanPos / nCbS | |

TABLE 1-continued

| palette_coding_component( x0, y0, CbWidth, CbHeight, NumComp ) { | Descriptor |
|---|---|

```
      }
    }
  }
  previousPaletteSize = palette_size
  for( i = 0; i < palette_size; i++ )
    for ( cIdx = compOffset; cIdx < NumComp + compOffset; cIdx++ )
      previousPaletteEntries[ cIdx ][ i ] = palette_entries[ cIdx ][ i ]
}
```

The following paragraphs describe exemplary semantics of syntax elements in Table 1.

previous_palette_entry_flag[i] equal to 1 specifies that the palette entry from the previous used palette is copied. previous_palette_entry_flag [i] equals to 0 specifies that the palette entry from the previous used palette is not copied. The previousPaletteSize is the size of the palette of the previous CU decoded in palette mode. The variable previousPaletteSize is set equal to 0 for the first decoded palette CU of each CTB line as well as slice.

palette_num_signalled_entries specifies the number of entries in the palette that are explicitly signalled for the current CU. When palette_num_signalled_entries is not present, it is inferred to be equal to 0.

palette_entries[cIdx][i] specifies the i-th element in the palette for the color component cIdx. The array previousPaletteEntries is equal to the array palette_entries of the last CU decoded in palette mode.

palette_escape_val specifies the escape pixel value.

palette_run_type_flag equal to 1 specifies that the decoding process is COPY_ABOVE_MODE where the decoded pixel value is equal to the pixel at the same location in the above row. palette_run_type_flag equal to 0 specifies that the decoding process mode is INDEX_MODE where the pixel's palette index is coded in the bitstream. When palette_run_type_flag is not present, it is inferred to be equal to INDEX_MODE.

palette_index is an index to the palette entries. If palette_index is equal to palette_size, the pixel is coded as ESCAPE_PIXEL.

palette_run indicates the number of consecutive locations minus 1 with the same palette index as the position in the above row when palette_run_type_flag is equal to COPY_ABOVE_MODE or represents the number of consecutive locations minus 1 with the same palette index when palette_run_type_flag is equal to INDEX_MODE.

Thus, in palette mode (i.e., palette-based coding), a palette may consist of entries numbered by an index representing color component values which can be used as a predictor for block samples or as final reconstructed block samples. Each entry in the palette may contain one color component (for example, luma value) or two components (for example, two chroma values) or a triplet of three color components (for example, RGB, YUV etc.). Samples in the palette mode block are coded using run-length coding. For example, three run-modes may be used, including 'copy-left' (which may also be referred to herein as 'index-copy'), 'copy-above', and 'escape.' See e.g., Pu et al., "SCCE3 base Software Bugfix Report," Joint Collaborative Team on Video Coding (JCT-VC) of ITU-T SG 16 WP 3 and ISO/IEC JTC 1/SC 29/WG 11, 18th Meeting, Sapporo, J P, 30 Jun.-9 Jul. 2014, document JCTVC-R0306 (hereinafter, "JCTVC-R0306-WD").

In some examples, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

To reduce bits used to signal a palette, entries in the palette may be predicted using previously decoded palette entries (See e.g., JCTVC-R0306-WD and Gisquet et al., "SCCE3 Test A.3: palette stuffing," Joint Collaborative Team on Video Coding (JCT-VC) of ITU-T SG 16 WP 3 and ISO/IEC JTC 1/SC 29/WG 11, 18th Meeting, Sapporo, J P, 30 Jun.-9 Jul. 2014, document JCTVC-R0082 (hereinafter, "JCTVC-R0082"). The previously decoded palette entries, after pruning out duplicated entries, form a list, referred to herein as a palette predictor list. For each entry in the palette predictor list, one bin is used to indicate whether the corresponding entry is re-used in the current palette or not. These bins form a binary vector. In JCTVC-R0306-WD, this vector corresponds to the syntax elements previous_palette_entry_flag[i]. Various methods have been developed to compress this vector, such as Karczewicz et al., "SCCE3: Test A.8—Improvements on palette prediction vector signaling," Joint Collaborative Team on Video Coding (JCT-VC) of ITU-T SG 16 WP 3 and ISO/IEC JTC 1/SC 29/WG 11, 18th Meeting, Sapporo, J P, 30 Jun.-9 Jul. 2014, document JCTVC-R0063 (hereinafter, "JCTVC-R0063").

Figure 2:
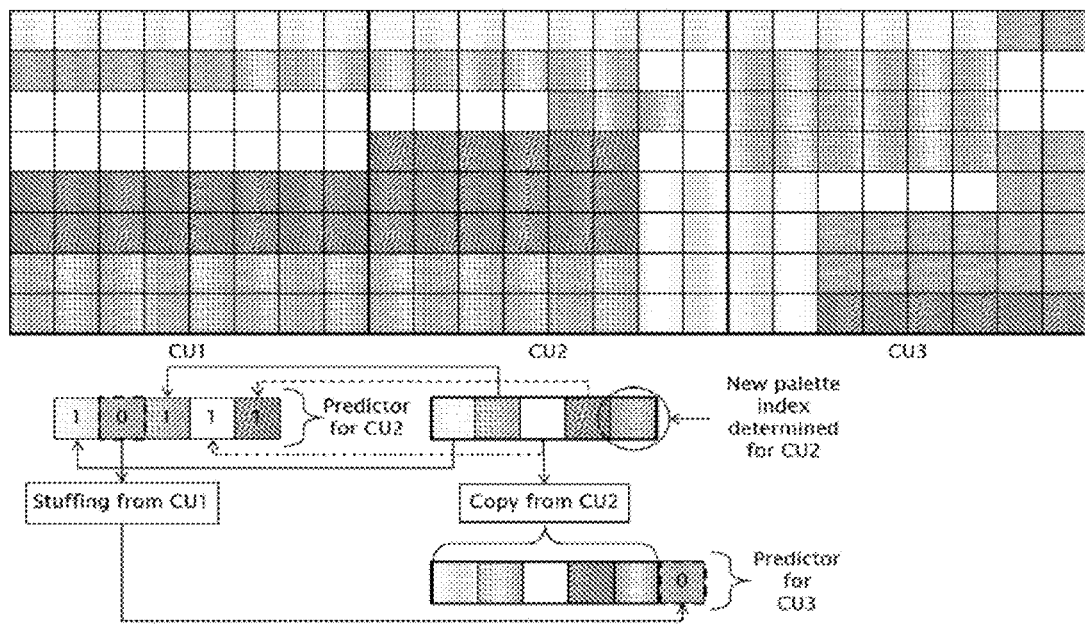
FIG. 2 is a conceptual diagram illustrating an example palette stuffing process.

Gisquet et al., "AhG10: palette predictor stuffing," Joint Collaborative Team on Video Coding (JCT-VC) of ITU-T SG 16 WP 3 and ISO/IEC JTC 1/SC 29/WG 11, 18th Meeting, Sapporo, J P, 30 Jun.-9 Jul. 2014, document JCTVC-Q0063 (hereinafter, "JCTVC-Q0063") provides another example of how to generate the palette predictor list. In JCTVC-Q0063, a video coder uses the last coded palette as a predictor. JCTVC-Q0063 proposed stuffing, at the end of this predictor, the unused values from the current predictor, as shown in FIG. 2. FIG. 2 is a conceptual diagram illustrating an example palette stuffing process. In FIG. 2, after CU1 has been encoded, a predictor is made available to CU2. Currently, it is the palette of CU1. Bit flags indicating the reuse of the predictor elements are generated and coded. CU2 palette would normally be used as the predictor of CU3. By checking the bit flags from the palette predictor of CU2, it is possible to determine which elements have not been reused. Those elements are added to the end of the predictor.

Including the additional elements in the predictor may be beneficial because those elements have actually occurred in the past, and may still occur. However, the probability of those additional elements occurring again is lower. By this recursive construction, a predictor is generated, where elements are somewhat ordered by probability. In addition, it may be possible and beneficial to increase the size of the predictor, due to the high compression ratio a valid prediction offers.

Figure 3:
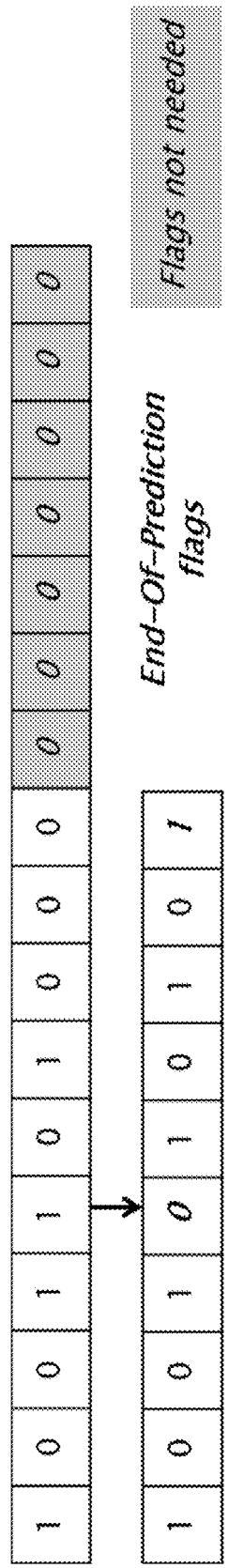
FIG. 3 is a conceptual diagram illustrating example prediction flags.

Particularly when a size of the predictor is much larger than the actual palette to predict, it may happen that the palette is predicted by elements mostly at the start of the predictor, as depicted is FIG. 3. FIG. 3 is a conceptual diagram illustrating example prediction flags. As can be seen in FIG. 3, the prediction scheme may have a limited efficiency. A typical improvement would be CABAC coding of the elements, but this would require frequent updating for at least 32 flags. JCTVC-Q0063 proposed instead to add intermediate flags, called "end-of-prediction," to indicate when elements can be no longer predicted. However, because this adds more flags, it may cause an expansion of the bitmap of flags. Therefore, it may be better to insert flags at specific locations in the bitmap.

In some instances, at video decoder 30, after decoding all of the previous_palette_entry_flag syntax elements, the entries in the palette predictor list whose corresponding previous_palette_entry_flag equals to 1 are placed at the beginning of the palette of the current block. In other words, the current palette can be logically divided into two zones. The first zone (named as ZONE_P hereafter, which is placed at the beginning) is composed of re-used entries from the palette predictor list. The second zone (named as ZONE_T hereafter, which is placed after the first zone) is composed of new palette entries which are not in the palette predictor list and directly signaled in the bitstream.

Palette predictor list does not include so-called "escape pixels" used in a previously-coded block. Escape pixels are pixels present in a palette-coded block, but not included in the palette for the block. For instance, escape pixels may be directly signaled and, in some examples, are not predictively coded. There may be an elevated probably the escape pixels of the previous block are also used in the current block, especially if those escape pixels are adjacent to the current block. Hence, it may be advantageous to include at least some of the escape pixels of the previously-coded block in the palette predictor list for the current block. If such escape pixels are not included in a palette predictor list, but are used in the current block, such pixels may need to be signaled as additional palette entries of the current block or escape pixels of the current block.

This disclosure proposes the use of neighboring reconstructed pixels (e.g., pixels from one or more lines immediately above the current block, if available, and one or more lines immediately to the left of the current block, if available) as additional candidate palette predictors to predict the current block's palette. To avoid confusion, this disclosure refers to the palette predictor list based on a palette of a previous block, such as the palette predictor list used in JCTVC-Q0063, as the "original palette predictor list."

This disclosure proposes the use of neighboring reconstructed pixels to construct another palette prediction list, referred to herein as an "extra palette predictor list." For example, if the neighboring reconstructed pixels specify sample values 3, 5, and 7, a video coder may determine an extra palette predictor list that includes candidates (i.e., entries) specifying sample values 3, 5, and 7.

For example, video encoder 20 may determine a palette predictor list consisting one or more candidates. In this example, each respective candidate in the palette predictor list specifies at least one sample value of a different respective reconstructed neighboring pixel from among one or more reconstructed neighboring pixels. In this example, each of the one or more reconstructed neighboring pixels is in a line above or a column left of a current block of the video data. Furthermore, in this example, video encoder 20 may include, in a palette for the current block, at least one candidate in the palette predictor list. In this example, video encoder 20 may signal, in a bitstream, one or more syntax elements indicating an index value for a pixel of the current block, the index value corresponding to an entry in the palette.

In a similar example, video decoder 30 may determine a palette predictor list comprising or consisting of one or more candidates. In this example, each respective candidate in the palette predictor list specifies at least one sample value of a different respective reconstructed neighboring pixel from among one or more reconstructed neighboring pixels. In this example, each of the one or more reconstructed neighboring pixels is in a line above or a column left of a current block of the video data. Furthermore, in this example, video decoder 30 may include, in a palette for the current block, at least one candidate in the palette predictor list. In some instances, video decoder 30 does not include any of the candidates in the palette for the current block. Video decoder 30 may also obtain, based on one or more syntax elements signaled in a bitstream, an index value for a pixel of the current block. For example, the one or more syntax elements may specify the index value. In another example, video decoder 30 may obtain the index value by inferring, based on the one or more syntax elements and a particular rule, the index value for the pixel of the current block. In this example, video decoder 30 may identify a palette entry in the palette that corresponds to the index value for the pixel. Video decoder 30 may also determine, based on the at least one sample value specified by the identified palette entry, at least one reconstructed sample value of the pixel.

In accordance with some examples of this disclosure, assuming there are N (>=0 or >0) entries in the "extra palette predictor list," video encoder 20 may signal a binary vector (e.g., an array of binary values) whose size is equal to N in the bitstream to indicate whether each individual entry in the "extra palette predictor list" is re-used by the current block or not. For example, if N is equal to 5, video encoder 20 may signal a binary vector 11101 to indicate that the first, second, third, and fifth candidates in the extra palette predictor list are reused in the current block. If a candidate is not reused in the current block, a video coder may omit the candidate from the palette of the current block. The binary vector may be transmitted directly in the bitstream or compressed using the method used to compress the original palette predictor list.

In this way, video encoder 20 may determine a palette predictor list that comprises one or more candidates. Each respective candidate in the palette predictor list may specify a value of a different reconstructed neighboring pixel from among one or more reconstructed neighboring pixels. Each of the one or more reconstructed neighboring pixels is in a line above or a column left of a current block (e.g., CU, macroblock, etc.) of the video data. Furthermore, video encoder 20 may signal, in a bitstream, a binary vector comprising one or more syntax elements. Each of the one or more syntax elements corresponds to a different candidate in the palette predictor list. For each respective candidate in the palette predictor list, if the syntax element corresponding to the respective candidate indicates that a palette for a current block of the video data includes the value specified by the respective candidate, the palette includes a palette entry specifying the value specified by the respective candidate. If the syntax element corresponding to the respective candidate indicates that the palette does not include the value specified by the respective candidate, the palette omits the palette entry specifying the value specified by the respective candidate. Furthermore, video encoder 20 may signal, in the bitstream, one or more syntax elements indicating an index value for a sample of the current block, the index value corresponding to an entry in the palette. In some examples, the palette entries in the palette for the current block may specify residual pixel values. In other examples, the palette entries for the current block may specify non-residual pixel values.

Furthermore, in this way, video decoder 30 may determine a palette predictor list that comprises one or more candidates, each respective candidate in the palette predictor list specifying a value of a different reconstructed neighboring pixel from among one or more reconstructed neighboring pixels, wherein each of the one or more reconstructed neighboring pixels is in a line above or a column left of a current block (e.g., CU, macroblock, etc.) of the video data. Video decoder 30 may obtain, from a bitstream, a binary vector comprising one or more syntax elements, wherein each of the one or more syntax elements corresponds to a different candidate in the palette predictor list. For each respective candidate in the palette predictor list, if the syntax element corresponding to the respective candidate indicates that a palette for a current block of the video data includes the value specified by the respective candidate, video decoder 30 may include, in the palette, a palette entry specifying the value specified by the respective candidate. If the syntax element corresponding to the respective candidate indicates that the palette does not include the value specified by the respective candidate, video decoder 30 may omit, from the palette, the palette entry specifying the value specified by the respective candidate. Furthermore, video decoder 30 may obtain, based on one or more additional syntax elements signaled in a bitstream, an index value for a sample of the current block. Additionally, video decoder 30 may identify a palette entry in the palette that corresponds to the index value for the sample. Video decoder 30 may determine, based on a pixel value specified by the identified palette entry, a reconstructed value of the sample. For instance, in some examples, the reconstructed value of the sample may match the pixel value specified by the identified palette entry. In other example, the pixel value specified by the identified palette entry is a residual pixel value and video decoder 30 may determine the reconstructed value of the sample such that the reconstructed value of the sample is equal to a sum of the pixel value specified by the palette entry and a pixel value of a predictive block.

Figure 4:
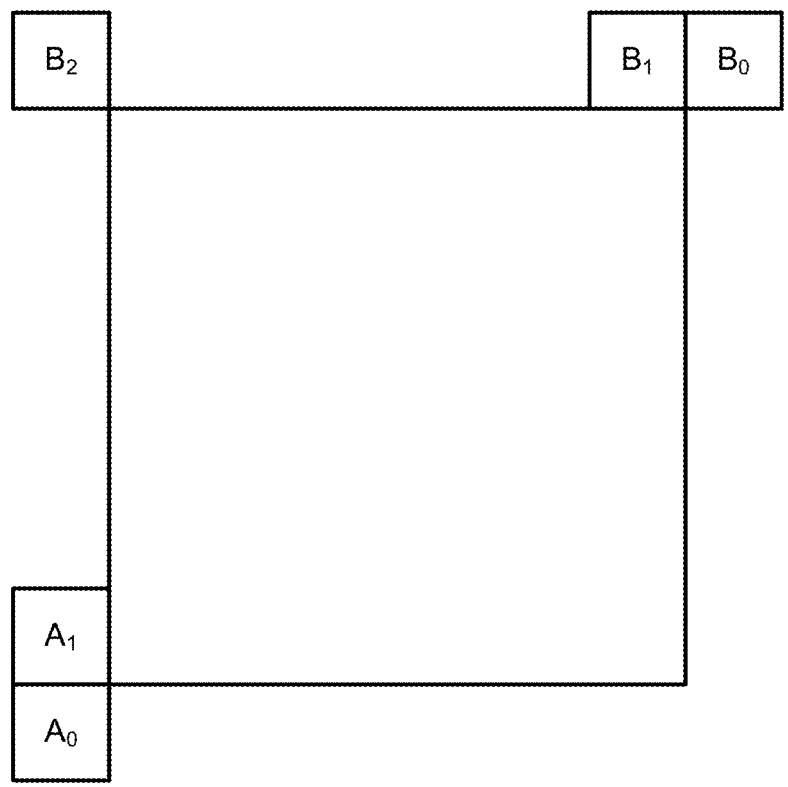
FIG. 4 is a conceptual diagram illustrating candidate pixels for an extra palette predictor list.

In accordance with one or more techniques of this disclosure, a video coder may perform an "extra palette predictor list" construction method. In a first example construction method, a video coder picks up to K (where K>0) neighboring reconstructed pixels to form the "extra palette predictor list." In some examples, K=5 and the video coder uses the pixels $A_0$, $A_1$, $B_0$, $B_1$, and $B_2$, in FIG. 4. FIG. 4 is a conceptual diagram illustrating candidate pixels for an extra palette predictor list. For example, if pixels $A_0$, $A_1$, $B_0$, $B_1$, and $B_2$ specify sample values 5, 10, 15, 20, and 25, respectively, the video coder may determine an extra palette predictor list including candidates specifying sample values 5, 10, 15, 20, and 25, respectively. Thus, the reconstructed neighboring pixels used in the extra palette prediction list may include at least one of: a below-left reconstructed neighboring pixel (i.e., $A_0$), a left reconstructed neighboring pixel (i.e., $A_1$), an above-left reconstructed neighboring pixel (i.e., $B_2$), an above reconstructed neighboring pixel (i.e., $B_1$), or an above-right reconstructed neighboring pixel (i.e., $B_0$). An order is defined to rank the K candidates. As an example, the candidates may be ordered as ($B_2$, $A_0$, $B_0$, $A_1$, $B_1$). A pruning process may be applied to remove duplicate candidates. After pruning, if there are less than K candidates, certain predefined candidates may be added. For example, an entry with YUV value (0, 0, 0) may be added. As another example, an entry with YUV value (128, 128, 128) may be added.

The video coder may remove redundant candidates from the list. In some examples, a candidate close to another candidate before itself in the list may also be removed from the list. For instance, the video coder may remove a particular candidate from the extra palette predictor list if another candidate in the extra palette predictor list is close to the particular candidate. For example, if a threshold distance is 5, a sample value specified by a first candidate in the extra palette predictor list is 100, and a sample value specified by a second candidate in the extra palette predictor list is 99, the video coder may remove either the first or second candidates from the extra palette predictor list. The 'closeness' can be measured using metrics such as sum of absolute differences (SAD) or sum of squared error (SSE).

In another example construction method, a video coder ranks the pixels in the above line and left column or a subset of the pixels coming from the above line and left column according to their number of occurrence. High frequency pixels are placed in front of the low frequency pixels in the extra palette predictor list. Thus, in some examples, as part of determining the extra palette predictor list, the video coder may rank, within the extra palette predictor list, two or more of the plurality of reconstructed neighboring pixels according to frequency of sample values of the plurality of the reconstructed neighboring pixels. For example, if the extra palette predictor list includes candidates A, B, C, and D, and candidate D corresponds to a sample value occurring twice among the neighboring pixels, while candidates A, B, and C correspond to sample values only occurring once among the neighboring pixels, the video coder may rank, within the extra palette predictor list, the candidates such that candidate D precedes candidates A, B, and C.

This ranking may be based on the assumption that if a sample value is used more frequently among the neighboring pixels, the sample value is more likely to be used in the current block. Furthermore, because index values indicating palette entries may be represented as unary codes, associating more likely sample values with smaller index values may reduce bitstream size. Hence, ranking more likely candidates at the beginning of the extra palette predictor list may reduce bitstream size.

In some examples, the video coder may apply a list truncation process to cut the candidate list size to N if there are more than N candidates in the extra palette predictor list. Thus, in some examples, as part of determining the extra palette predictor list, the video coder may truncate the extra palette predictor list such that a size of the extra palette predictor list is limited to a particular number of candidates. For example, if N is 4 and the extra palette predictor list includes candidates A, B, C, D, E, and F, the video coder may truncate the extra palette predictor list such that the extra palette predictor list only includes candidates A, B, C, and D.

Furthermore, in some examples, the reconstructed neighboring pixels may be 'before in-loop filtering' values to reduce decoding delay. For instance, a video coder may apply in-loop filtering to the one or more reconstructed neighboring pixels after determining the palette predictor list.

In accordance with one or more techniques of this disclosure, after a video coder constructs the extra palette predictor list and the original palette predictor list for the current block, the video coder may apply a pruning process. The video coder may construct the extra palette predictor list on per block basis. For example, an entry in the extra palette predictor list is removed if the entry is also contained in original palette predictor list. Furthermore, in some examples, an entry in the extra palette predictor list is removed if the minimum distance between this entry and any entry in the original palette predictor list is within a threshold. For example, if the distance is 5, a sample value specified by a candidate in the original palette predictor list is 101, and a sample value specified by a candidate in the extra palette predictor list is 99, the video coder may remove either the candidate in the original palette predictor list or the candidate in the extra palette predictor list. The threshold may depend on quantization parameters. In some examples, the distance can be SAD, SSE, or other metrics.

In some examples, the entries in the extra palette predictor list may not be merged into the original palette predictor list after decoding the current block. Thus, in such examples, candidates of the palette predictor list are not included in a palette predictor list used to determine a palette for a block of the video data processed after the current block.

In accordance with one or more techniques of this disclosure, assume that the palette entries in the current block coming from an extra palette predictor list form a new zone named as ZONE_E. A video coder may order the three zones in accordance with one or more of the following examples. In a first example, the video coder puts the entries coming from the extra palette predictor list to the beginning of the current block's palette, then the palette entries coming from the original palette predictor list. In other words, in this first example, the three zones are ordered as ZONE_E, ZONE_P, ZONE_T. In a second example, the video coder puts the entries coming from the original palette predictor list to the beginning of the current block's palette, then the palette entries coming from the extra palette predictor list. In other words, in this second example, the three zones are ordered as ZONE_P, ZONE_E, ZONE_T. Other orders, such as ZONE_P, ZONE_T, ZONE_E, may also be used.

Figure 5:
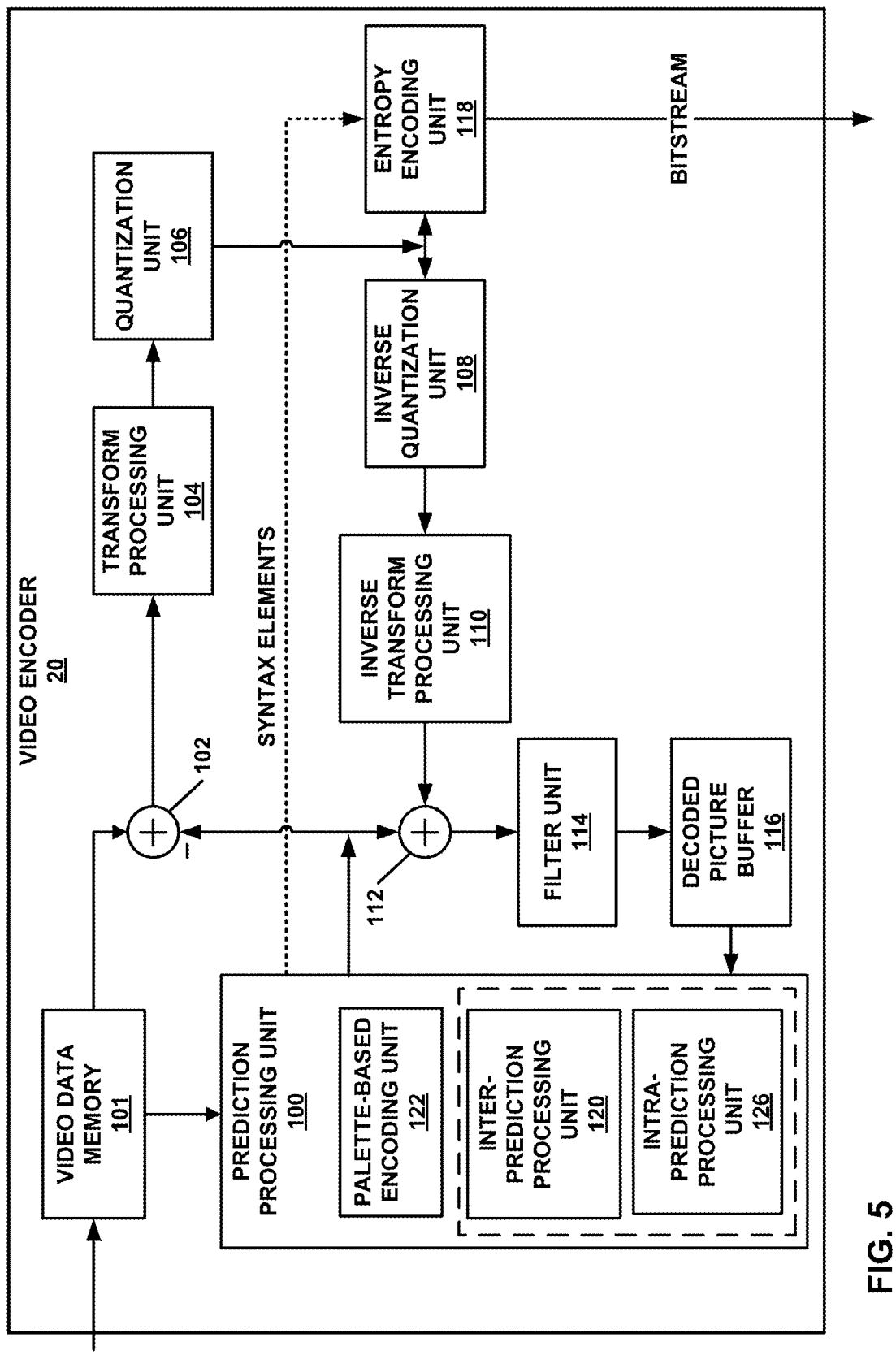
FIG. 5 is a block diagram illustrating an example video encoder that may implement the techniques described in this disclosure.

FIG. 5 is a block diagram illustrating an example video encoder 20 that may implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1. Video encoder 20, in one example, may be configured to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. The signaled information may be used by video decoder 30 to decode video data.

In the example of FIG. 5, video encoder 20 includes a video data memory 101, a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, containing sample blocks that most closely corresponds to the prediction blocks of the PU. Inter-prediction processing unit 120 may generate a reference index indicating a position in RefPicList0 of the reference picture containing the reference region for the PU. In addition, inter-prediction processing unit 120 may generate a motion vector indicating a spatial displacement between a prediction block of the PU and a reference location associated with the reference region. For instance, the motion vector may be a two-dimensional vector indicating an offset from the coordinates in the current decoded picture to coordinates in a reference picture. Inter-prediction processing unit 120 may output the reference index and the motion vector as the motion information of the PU. Inter-prediction processing unit 120 of inter-prediction processing unit 120 may generate the predictive blocks of the PU based on actual or interpolated samples at the reference location indicated by the motion vector of the PU.

If a PU is in a B slice, inter-prediction processing unit 120 may perform uni-prediction or bi-prediction for the PU. To perform uni-prediction for the PU, inter-prediction processing unit 120 may search the reference pictures of RefPicList0 or a second reference picture list ("RefPicList1") for a reference region for the PU. Inter-prediction processing unit 120 may output, as the motion information of the PU, a reference index indicating a position in RefPicList0 or RefPicList1 of the reference picture containing the reference region, a motion vector indicating a spatial displacement between a sample block of the PU and a reference location associated with the reference region, and one or more prediction direction indicators indicating whether the reference picture is in RefPicList0 or RefPicList1. Inter-prediction processing unit 120 may generate the predictive blocks of the PU based at least in part on actual or interpolated samples at the reference region indicated by the motion vector of the PU.

To perform bi-directional inter prediction for a PU, inter-prediction processing unit 120 may search the reference pictures in RefPicList0 for a reference region for the PU and may also search the reference pictures in RefPicList1 for another reference region for the PU. Inter-prediction processing unit 120 may generate reference picture indexes indicating positions in RefPicList0 and RefPicList1 of the reference pictures containing the reference regions. In addition, inter-prediction processing unit 120 may generate motion vectors indicating spatial displacements between the reference locations associated with the reference regions and a prediction block of the PU. The motion information of the PU may include the reference indexes and the motion vectors of the PU. Inter-prediction processing unit 120 may generate the predictive blocks of the PU based at least in part on actual or interpolated samples at the reference region indicated by the motion vector of the PU.

In accordance with various examples of this disclosure, video encoder 20 may be configured to perform palette-based coding. With respect to the HEVC framework, as an example, the palette-based coding techniques may be configured to be used as a CU mode. In other examples, the palette-based coding techniques may be configured to be used as a PU mode in the framework of HEVC. Accordingly, the disclosed processes described herein (throughout this disclosure) in the context of a CU mode may, additionally or alternatively, apply to PUs. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based encoding, e.g., for a CU or PU. For example, palette-based encoding unit 122 may be configured to generate a palette including entries, each indicating at least one sample value, select sample values in a palette to represent sample values of at least some positions of a block of video data, and signal information associating at least some of the positions of the block of video data with entries in the palette corresponding, respectively, to the selected sample values. Although various functions are described as being performed by palette-based encoding unit 122, some or all of such functions may be performed by other processing units, or a combination of different processing units. In other examples, palette-based encoding unit 122 may be outside prediction processing unit 100.

In accordance with some examples of this disclosure, palette-based encoding unit 122 may determine a palette predictor list including or consisting of one or more candidates. Each respective candidate in the palette predictor list may specify at least one sample value of a different respective reconstructed neighboring pixel from among one or more reconstructed neighboring pixels. Each of the one or more reconstructed neighboring pixels may be in a line above or a column left of a current block of the video data. Palette-based encoding unit 122 may include, in a palette for the current block, at least one candidate in the palette predictor list. Furthermore, palette-based encoding unit 122 may signal, in a bitstream, one or more syntax elements indicating an index value for a pixel location within the current block, the index value corresponding to an entry in the palette.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. In some examples, intra-prediction processing unit 126 may determine samples of a predictive block based on values of reference samples in neighboring blocks. The neighboring blocks may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) of a CU and the selected predictive blocks (e.g., predictive luma, Cb and Cr blocks) of the PUs of the CU, residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block of a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture containing the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 6:
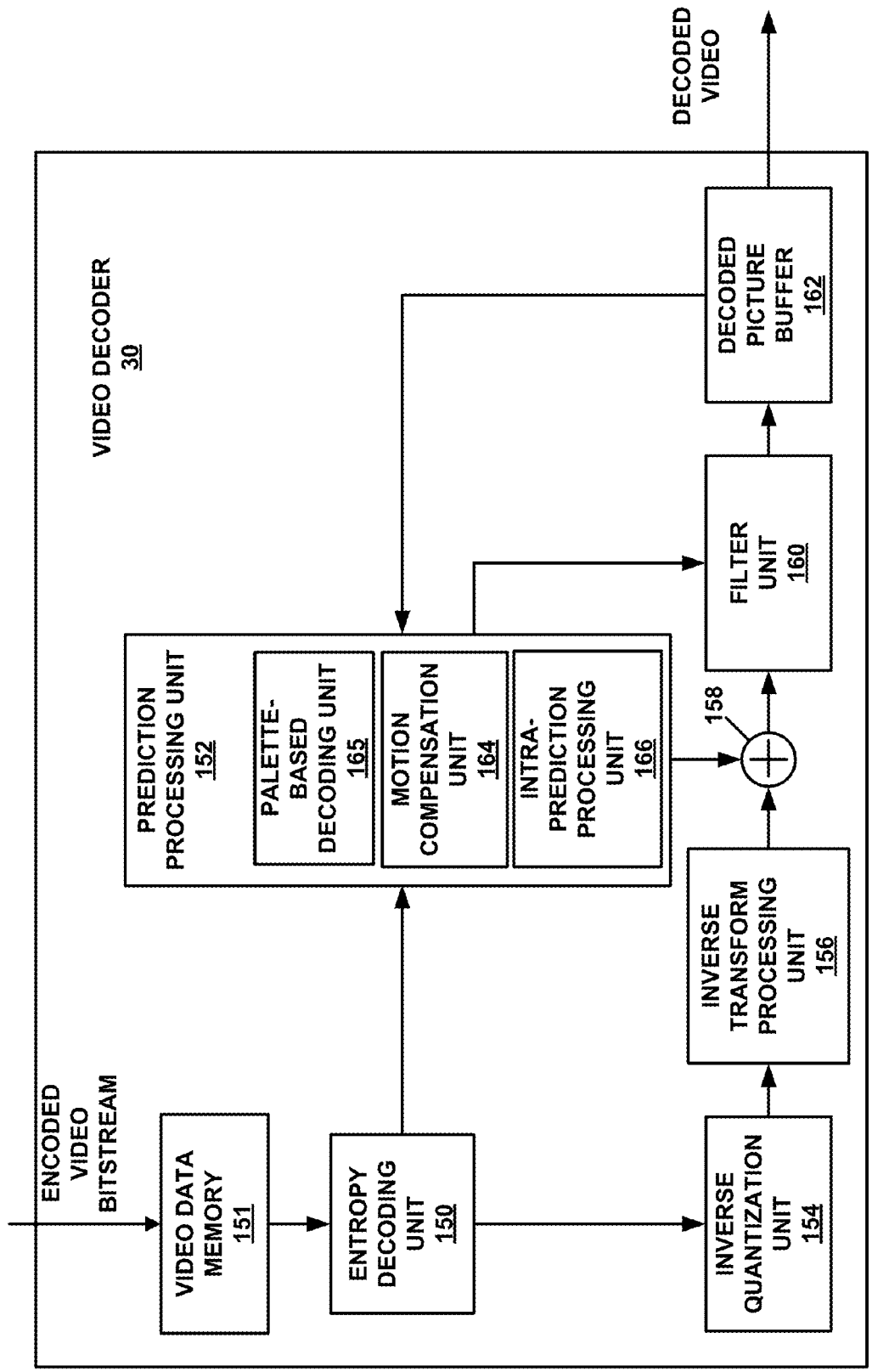
FIG. 6 is a block diagram illustrating an example video decoder that may implement the techniques described in this disclosure.

FIG. 6 is a block diagram illustrating an example video decoder 30 that is configured to implement the techniques of this disclosure. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device configured to perform techniques for palette-based video coding in accordance with various examples described in this disclosure. For example, video decoder 30 may be configured to selectively decode various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1. Video decoder 30, in one example, may be configured to generate a palette having entries indicating pixel values, receive information associating at least some positions of a block of video data with entries in the palette, select pixel values in the palette based on the information, and reconstruct pixel values of the block based on the selected pixel values.

In the example of FIG. 6, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from channel 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and may parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive blocks (e.g., predictive luma, Cb and Cr blocks) for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive blocks (e.g., predictive luma, Cb and Cr blocks) for the PU.

Reconstruction unit 158 may use the transform blocks (e.g., luma, Cb and Cr transform blocks) of TUs of a CU and the predictive blocks (e.g., predictive luma, Cb and Cr blocks) of the PUs of the CU, i.e., either intra-prediction data or inter-prediction data, as applicable, to reconstruct the coding blocks (e.g., luma, Cb and Cr coding blocks) of the CU. For example, reconstruction unit 158 may add samples of the transform blocks (e.g., luma, Cb and Cr transform blocks) to corresponding samples of the predictive blocks (e.g., predictive luma, Cb and Cr blocks) to reconstruct the coding blocks (e.g., luma, Cb and Cr coding blocks) of the CU.

Filter unit 160 may perform a deblocking operation to reduce blocking artifacts associated with the coding blocks (e.g., luma, Cb and Cr coding blocks) of the CU. Video decoder 30 may store the coding blocks (e.g., luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb and Cr blocks) in decoded picture buffer 162, intra prediction or inter prediction operations on PUs of other CUs. In this way, video decoder 30 may extract, from the bitstream, transform coefficient levels of a significant coefficient block, inverse quantize the transform coefficient levels, apply a transform to the transform coefficient levels to generate a transform block, generate, based at least in part on the transform block, a coding block, and output the coding block for display.

Palette-based decoding unit 165, for example, may perform palette-based decoding when a palette-based decoding mode is selected, e.g., for a CU or PU. For example, palette-based decoding unit 165 may be configure to generate a palette having entries indicating pixel values, receive information associating at least some positions of a block of video data with entries in the palette, select pixel values in the palette based on the information, and reconstruct pixel values of the block based on the selected pixel values. Although various functions are described as being performed by palette-based decoding unit 165, some or all of such functions may be performed by other processing units, or a combination of different processing units.

In accordance with some examples of this disclosure, palette-based decoding unit 165 may determine a palette predictor list including or consisting of one or more candidates. Each respective candidate in the palette predictor list may specify at least one sample value of a different respective reconstructed neighboring pixel from among one or more reconstructed neighboring pixels. Each of the one or more reconstructed neighboring pixels may be in a line above or a column left of a current block of the video data. Furthermore, palette-based decoding unit 165 may include, in a palette for the current block, at least one candidate in the palette predictor list. Palette-based decoding unit 165 may obtain, based on one or more syntax elements signaled in a bitstream, an index value for a pixel of the current block. Furthermore, palette-based decoding unit 165 may identify a palette entry in the palette that corresponds to the index value for the pixel. Additionally, palette-based decoding unit 165 may determine, based on the at least one sample value specified by the identified palette entry, at least one reconstructed sample value of the pixel. By determining reconstructed sample values of pixels of the current block, palette-based decoding unit 165 may reconstruct the current block.

Figure 7:
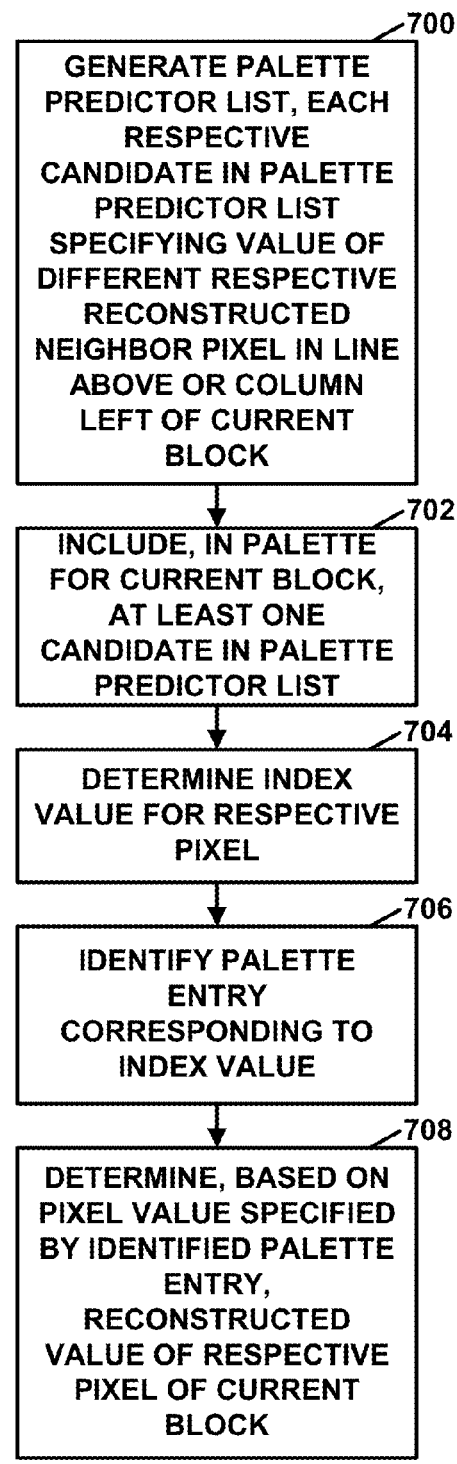
FIG. 7 is a flowchart illustrating an example decoding operation, in accordance with a technique of this disclosure.

FIG. 7 is a flowchart illustrating an example decoding operation, in accordance with a technique of this disclosure. The flowcharts of this disclosure are provided as examples. In other examples, the operations shown in the flowcharts may include more, fewer, or different actions. Moreover, in other examples, actions may be performed in different orders or in parallel. FIG. 7 is described from the context of video decoder 30, although other types of devices or decoders may also be used to perform the actions shown in FIG. 7.

In the example of FIG. 7, video decoder 30 determines a palette predictor list comprising or consisting of one or more candidates (700). Each respective candidate in the palette predictor list may specify at least one sample value of a different respective reconstructed neighboring pixel from among one or more reconstructed neighboring pixels. Each of the one or more reconstructed neighboring pixels is in a line above or a column left of a current block of the video data. Video decoder 30 may include, in a palette for the current block, at least one candidate in the palette predictor list (702).

Furthermore, video decoder 30 may obtain, based on one or more syntax elements (e.g., a palette_index syntax element) signaled in a bitstream, an index value for a pixel of the current block (704). Additionally, video decoder 30 may identify a palette entry in the palette that corresponds to the index value for the pixel (706). Video decoder 30 may determine, based on the at least one sample value specified by the identified palette entry, at least one reconstructed sample value of the pixel (708).

Figure 8:
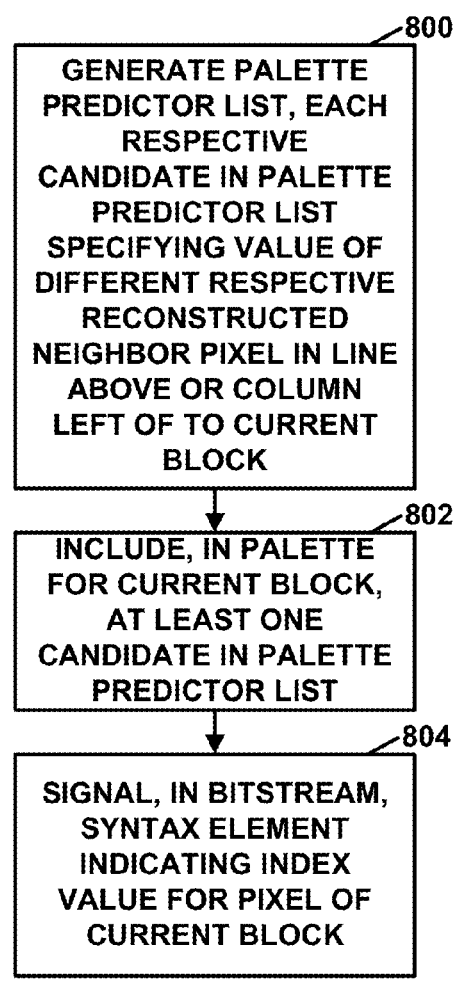
FIG. 8 is a flowchart illustrating an example encoding operation, in accordance with a technique of this disclosure.

FIG. 8 is a flowchart illustrating an example encoding operation, in accordance with a technique of this disclosure. FIG. 7 is described from the context of video encoder 20, although other types of devices or encoders may also be used to perform the actions shown in FIG. 8. In the example of FIG. 8, video encoder 20 determines a palette predictor list comprising or consisting one or more candidates (800). In the example of FIG. 8, each respective candidate in the palette predictor list specifies at least one value of a different respective reconstructed neighboring pixel from among one or more reconstructed neighboring pixels. Furthermore, in the example of FIG. 8, each of the one or more reconstructed neighboring pixels is adjacent to a current block of the video data.

In the example of FIG. 8, video encoder 20 includes, in a palette for the current block, at least one candidate in the palette predictor list (802). Video encoder 20 signals, in a bitstream, one or more syntax elements indicating an index value for a pixel of the current block, the index value corresponding to an entry in the palette (804).

Figure 9:
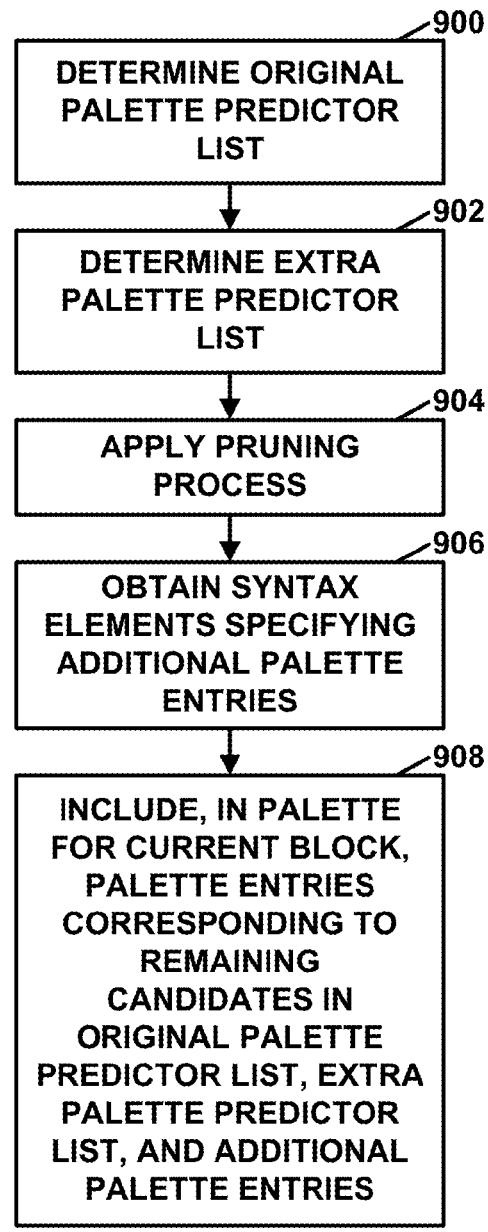
FIG. 9 is a flowchart illustrating an example operation for generating a palette, in accordance with a technique of this disclosure.
Figure 10:
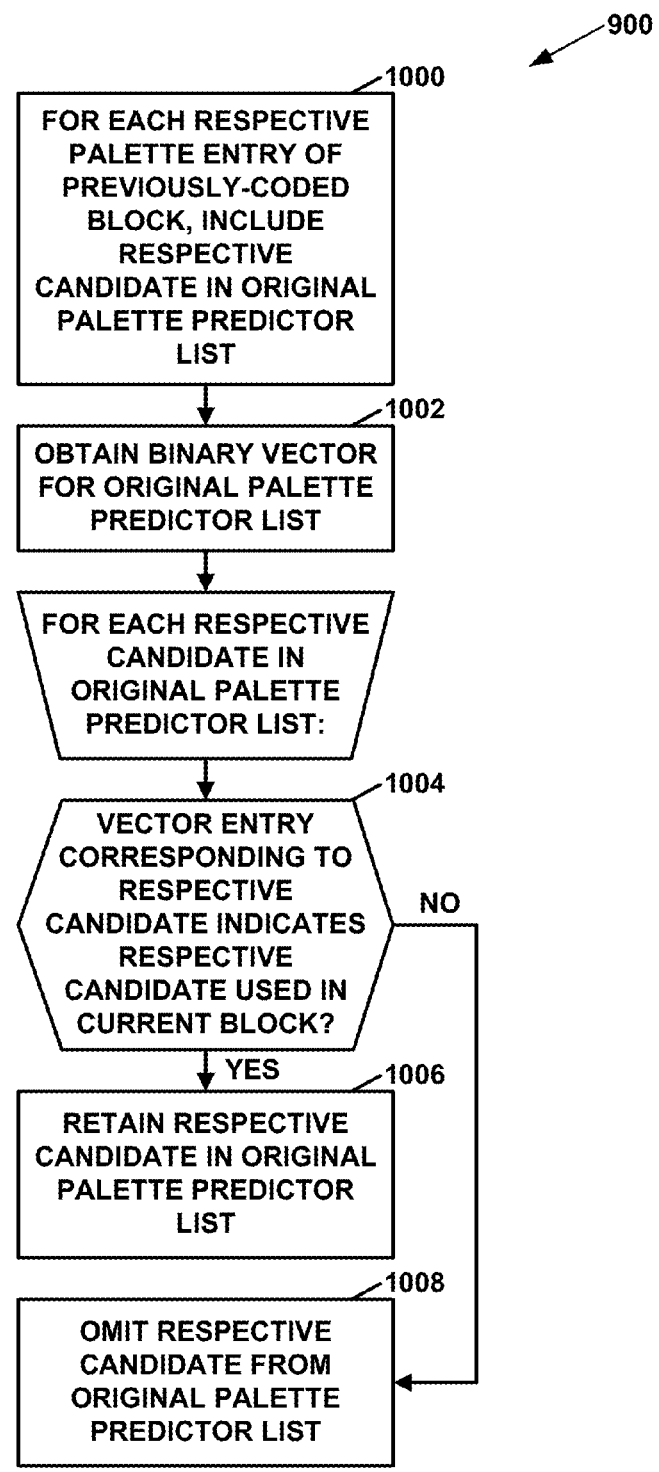
FIG. 10 is a flowchart illustrating an example operation of a video decoder to generate an original palette predictor list, in accordance with a technique of this disclosure.
Figure 12:
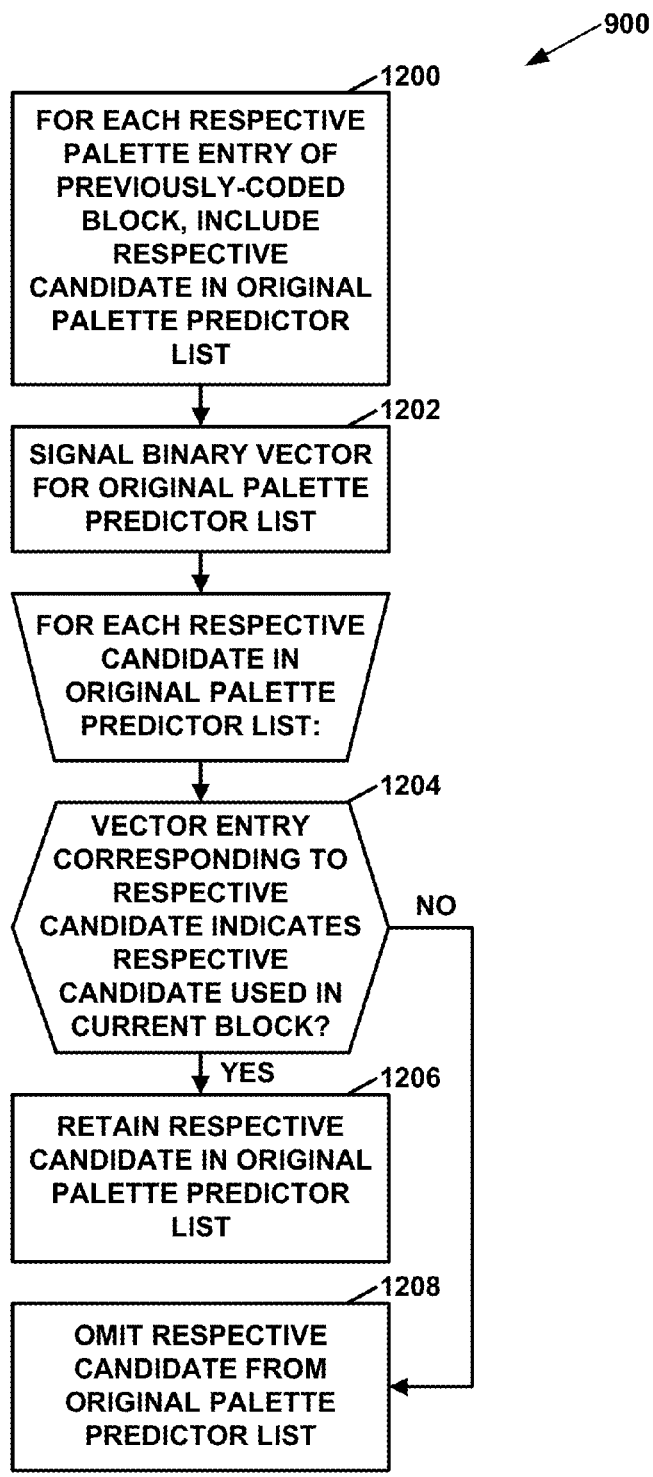
FIG. 12 is a flowchart illustrating an example operation of a video encoder to generate an original palette predictor list, in accordance with a technique of this disclosure.

FIG. 9 is a flowchart illustrating an example operation for generating a palette, in accordance with a technique of this disclosure. In the example of FIG. 9, a video coder (e.g., a video encoder or a video decoder) generates an original palette predictor list (900). FIG. 10, described in detail elsewhere in this disclosure, is an example operation a video decoder may use to generate the original palette predictor list. FIG. 12, described in detail elsewhere in this disclosure, is an example operation a video encoder may use to generate the original palette predictor list.

Figure 11:
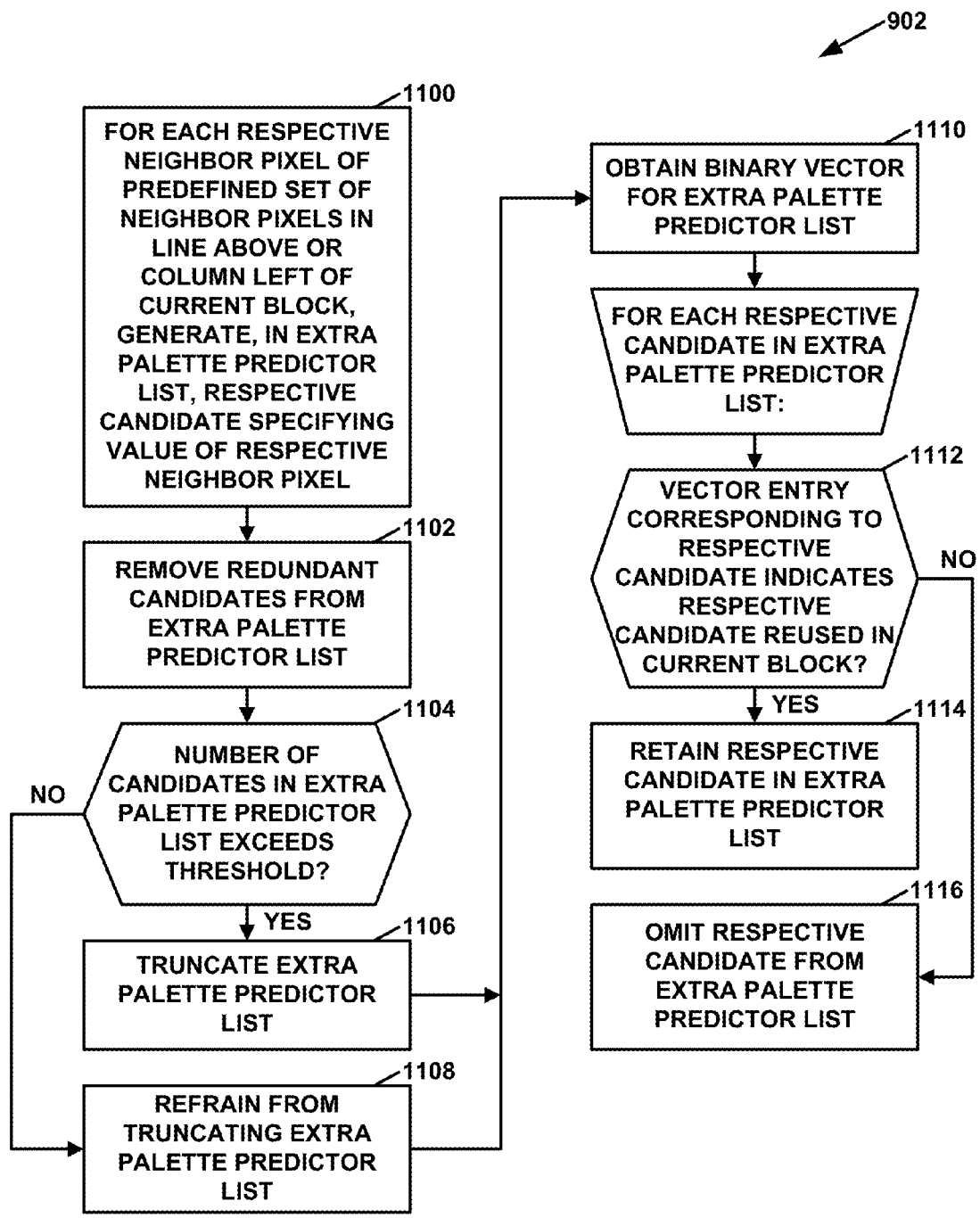
FIG. 11 is a flowchart illustrating an example operation of a video decoder to generate an extra palette predictor list, in accordance with a technique of this disclosure.
Figure 13:
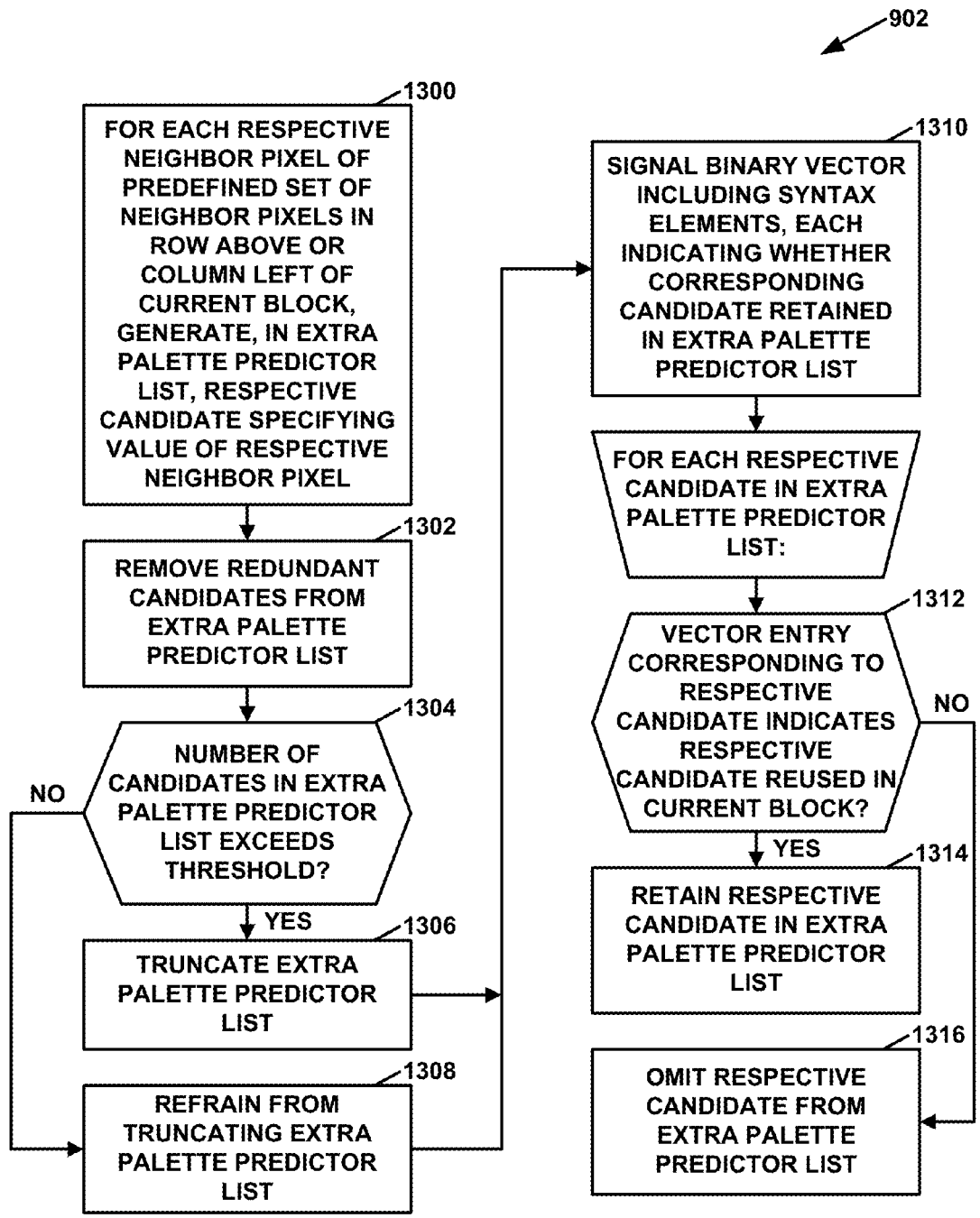
FIG. 13 is a flowchart illustrating an example operation of a video encoder to generate an extra palette predictor list, in accordance with a technique of this disclosure.

Furthermore, in the example of FIG. 9, the video coder generates an extra palette predictor list (902). FIG. 13, described in detail elsewhere in this disclosure, is an example operation of a video encoder to generate the extra palette predictor list. FIG. 11, described in detail elsewhere in this disclosure, is an example operation of a video decoder to generate the extra palette predictor list.

In the example of FIG. 9, the video coder applies a pruning process to the original palette predictor list and the extra palette predictor list (904). In other examples, the video coder does not perform the pruning process. The pruning process may remove, from the extra palette predictor list, a particular candidate in the extra palette predictor list if the particular candidate matches a candidate in the original palette predictor list. Furthermore, in some examples, as part of applying the pruning process, the video coder determines, based on a metric of similarity of a first candidate in the extra palette predictor list and a second candidate in the original palette predictor list, whether to remove the first candidate from the extra palette predictor list. The video coder may remove the first candidate from the extra palette predictor list responsive to the determination.

Furthermore, in the example of FIG. 9, the video coder obtains, from the bitstream, syntax elements (e.g., palette_entries syntax elements) specifying one or more additional palette entries (906). In the example of FIG. 9, the video coder includes, in the palette for the current block, palette entries corresponding to remaining candidates in the original palette predictor list, the extra palette predictor list, and the additional palette entries (908). In some examples, the video coder does not obtain any syntax elements specifying additional palette entries or include such additional palette entries in the palette.

In some examples, the video coder orders the palette entries in the palette for the current block as follows: palette entries specifying candidates in the extra palette predictor list, palette entries specifying candidates in the original palette predictor list, and the additional palette entries. In other examples, the video coder orders the palette entries in the palette for the current block as follows: palette entries specifying candidates in the original palette predictor list, palette entries specifying candidates in the extra palette predictor list, and the additional palette entries.

FIG. 10 is a flowchart illustrating an example operation of video decoder 30 to generate an original palette predictor list, in accordance with a technique of this disclosure. FIG. 10 is described from the context of video decoder 30, although other types of devices or decoders may also be used to perform the actions shown in FIG. 10. The operation of FIG. 10 may be an instance of action 900 of FIG. 9 to determine an original palette predictor list. In the example of FIG. 10, for each respective palette entry of a previously-coded block, video decoder 30 includes a respective candidate in the original palette predictor list (1000). The respective candidate specifies the same pixel as the respective palette entry. Thus, video decoder 30 may determine the original palette predictor list such that the original palette predictor list comprises one or more candidates, each respective candidate in the original palette predictor list specifying a palette entry in a palette for the previously-coded block of the video data. In some examples, the original palette predictor list may also include one or more candidates based on entries in a palette for a block coded prior to the previously-coded block, as described in JCTVC-R0082.

Furthermore, video decoder 30 may obtain, from the bitstream, a binary vector for the original palette predictor list (1002). In the example of FIG. 10, the binary vector for the original palette predictor list comprises one or more binary vector syntax elements (e.g., previous_palette_entry_flag syntax elements). Each of the one or more binary vector syntax elements corresponds to a different candidate in the original palette predictor list.

In the example of FIG. 10, video decoder 30 may perform actions (1004)-(1008) for each respective candidate in the original palette predictor list. Particularly, video decoder 30 may determine whether the binary vector syntax element corresponding to the respective candidate in the original palette predictor list indicates the respective candidate is reused in the current block (1004). Responsive to determining the binary vector syntax element corresponding to the respective candidate in the original palette predictor list indicates the respective candidate is reused in the current block ("YES" of 1004), video decoder 30 retains, in the original palette predictor list, the respective candidate (1006). Otherwise, responsive to determining the binary vector syntax element corresponding to the respective candidate in the original palette predictor list indicates the respective candidate is not reused in the current block ("NO" of 1004), video decoder 30 omits, from the original palette predictor list, the respective candidate (1008). For example, the binary vector "01001 . . . ." indicates that the second and fifth candidates in the original palette predictor list are retained in the original palette predictor list and the first, third, and fourth candidates in the original palette predictor list are ultimately omitted from the original palette predictor list.

Because video decoder 30 omits the respective candidate from the original palette predictor list, video decoder 30 effectively determines that the respective candidate is not included in the palette of the current block. Thus, in the example of FIG. 10, for each respective candidate in the original palette predictor list, video decoder 30 may determine, based on the binary vector syntax element corresponding to the respective candidate in the original palette predictor list, the respective candidate in the original palette predictor list is not included in the palette for the current block.

FIG. 11 is a flowchart illustrating an example operation of video decoder 30 to generate an extra palette predictor list, in accordance with a technique of this disclosure. Although FIG. 11 is described from the context of video decoder 30, other types of devices or decoders may also be used to perform the actions shown in FIG. 11. The operation of FIG. 11 may be an instance of action 902 of FIG. 9 to determine an extra palette predictor list. In the example of FIG. 11, for each respective neighbor pixel of a predefined set of neighbor pixels in a line above or a column left of a current block, video decoder 30 generates, in the extra palette predictor list, a respective candidate specifying the value of the respective neighbor pixel (1100).

Furthermore, video decoder 30 may remove redundant candidates from the extra palette predictor list (1102). For instance, video decoder 30 may remove matching candidates from the extra palette predictor list. In one example, as part of removing redundant candidates from the extra palette predictor list, video decoder 30 may determine, based on a metric of similarity of a first candidate in the palette predictor list and a second candidate in the palette predictor list, whether to remove the first candidate from the palette predictor list. In this example, video decoder 30 may remove the first candidate from the palette predictor list responsive to the determination.

In the example of FIG. 11, video decoder 30 may determine whether a number of candidates in the extra palette predictor list exceeds a threshold (1104). Responsive to determining the number of candidates in the extra palette predictor list exceeds the threshold ("YES" of 1104), video decoder 30 may truncate the extra palette predictor list such that a size of the extra palette predictor list is limited to a particular number of candidates (e.g., the threshold) (1106). Responsive to determining the number of candidates in the extra palette predictor list does not exceed the threshold ("NO" of 1104), video decoder 30 may refrain from truncating the extra palette predictor list (1108).

Additionally, video decoder 30 may obtain, from a bitstream, a binary vector for the extra palette predictor list (1110). The binary vector for the extra palette predictor list includes one or more syntax elements. Each of the one or more syntax elements corresponds to a different candidate in the palette predictor list.

In the example operation of FIG. 11, video decoder 30 may perform actions (1112) through (1116) for each respective candidate in the extra palette predictor list. Particularly, video decoder 30 determines whether the syntax element corresponding to the respective candidate indicates the respective candidate is reused in the current block (1112). Responsive to determining the syntax element corresponding to the respective candidate indicates the respective candidate is reused in the current block ("YES" of 1112), video decoder 30 retains, in the extra palette predictor list, the respective candidate (1114). Responsive to determining the syntax element corresponding to the respective candidate indicates the candidate is not reused in the current block ("NO" of 1112), video decoder 30 may omit, from the extra palette predictor list, the respective candidate (1116). For example, the binary vector "01001 . . . ." indicates the second and fifth candidates in the extra palette predictor list (e.g., the second and fifth neighboring reconstructed pixels) are retained in the extra palette predictor list and the first, third, and fourth candidates in the extra palette predictor list (e.g., the first, third, and fourth neighboring reconstructed pixels) are ultimately omitted from the extra palette predictor list.

Because video decoder 30 omits the respective candidate from the extra palette predictor list, video decoder 30 effectively determines the respective candidate is not included in the palette of the current block. Thus, in the example of FIG. 11, for each respective candidate in the extra palette predictor list, video decoder 30 may determine, based on the binary vector syntax element corresponding to the respective candidate in the extra palette predictor list, the respective candidate in the extra palette predictor list is not included in the palette for the current block.

FIG. 12 is a flowchart illustrating an example operation of video encoder 20 to generate an original palette predictor list, in accordance with a technique of this disclosure. Although FIG. 12 is described from the context of video encoder 20, other types of devices or decoders may also be used to perform the actions shown in FIG. 12. The operation of FIG. 12 may be an instance of action 900 of FIG. 9 to determine an original palette predictor list. In the example of FIG. 12, for each respective palette entry of a previously-coded block, video encoder 20 includes a respective candidate in the original palette predictor list (1200). The respective candidate specifies the same pixel as the respective palette entry. Thus, video encoder 20 may determine the original palette predictor list such that the original palette predictor list comprises one or more candidates, each respective candidate in the original palette predictor list specifying a palette entry in the palette for the previously-coded block of the video data. In some examples, the original palette predictor list may also include one or more candidates based on entries in a palette for a block coded prior to the previously-coded block, as described in JCTVC-R0082.

Furthermore, the video encoder 20 may signal, in the bitstream, a binary vector for the original palette predictor list (1202). In the example of FIG. 12, the binary vector for the original palette predictor list comprises one or more binary vector syntax elements. Each of the one or more binary vector syntax elements corresponds to a different candidate in the original palette predictor list.

In the example of FIG. 12, video encoder 20 may perform actions (1204)-(1208) for each respective candidate in the original palette predictor list. Particularly, video encoder 20 may determine whether the binary vector syntax element corresponding to the respective candidate in the original palette predictor list indicates respective candidate is reused in the current block (1204). Responsive to determining the binary vector syntax element corresponding to the respective candidate in the original palette predictor list indicates that the candidate is reused in the current block ("YES" of 1204), video encoder 20 retains, in the original palette predictor list, the respective candidate (1206).

Otherwise, responsive to determining the binary vector syntax element corresponding to the respective candidate in the original palette predictor list indicates the candidate is not reused in the current block ("NO" of 1204), video encoder 20 omits, from the original palette predictor list, the respective candidate (1208). Because video encoder 20 omits the respective candidate from the original palette predictor list, video encoder 20 effectively determines the respective candidate is not included in the palette of the current block. Thus, in the example of FIG. 12, for each respective candidate in the original palette predictor list, video encoder 20 may determine, based on the binary vector syntax element corresponding to the respective candidate in the original palette predictor list, the respective candidate in the original palette predictor list is not included in the palette for the current block.

FIG. 13 is a flowchart illustrating an example operation of video encoder 20 to generate an extra palette predictor list, in accordance with a technique of this disclosure. Although FIG. 13 is described from the context of video encoder 20, other types of devices or decoders may also be used to perform the actions shown in FIG. 13. The operation of FIG. 13 may be an instance of action 902 of FIG. 9 to determine an extra palette predictor list. In the example of FIG. 13, for each respective neighbor pixel of a predefined set of neighbor pixels in a line above or a column left of a current block, video encoder 20 generates, in the extra palette predictor list, a respective candidate specifying the value of the respective neighbor pixel (1300).

Furthermore, video encoder 20 may remove redundant candidates from the extra palette predictor list (1302). For instance, video encoder 20 may remove matching candidates from the extra palette predictor list. In one example, as part of removing redundant candidates from the extra palette predictor list, video encoder 20 may determine, based on a metric of similarity of a first candidate in the palette predictor list and a second candidate in the palette predictor list, whether to remove the first candidate from the palette predictor list. In this example, video encoder 20 may remove the first candidate from the palette predictor list responsive to the determination.

In the example of FIG. 13, video encoder 20 may determine whether a number of candidates in the extra palette predictor list exceeds a threshold (1304). Responsive to determining the number of candidates in the extra palette predictor list exceeds the threshold ("YES" of 1304), video encoder 20 may truncate the extra palette predictor list such that a size of the extra palette predictor list is limited to a particular number of candidates (e.g., the threshold) (1306). Responsive to determining the number of candidates in the extra palette predictor list does not exceed the threshold ("NO" of 1304), video encoder 20 may refrain from truncating the extra palette predictor list (1308).

Additionally, video encoder 20 may signal, in a bitstream, a binary vector for the extra palette predictor list (1310). The binary vector for the extra palette predictor list includes one or more syntax elements. Each of the one or more syntax elements corresponds to a different candidate in the palette predictor list.

In the example operation of FIG. 13, video encoder 20 may perform actions (1312) through (1316) for each respective candidate in the extra palette predictor list. Particularly, video encoder 20 determines whether the syntax element corresponding to the respective candidate indicates the respective candidate is re-used in the current block (1312). Responsive to determining the syntax element corresponding to the respective candidate indicates the respective candidate is reused in the current block ("YES" of 1312), video encoder 20 retains, in the extra palette predictor list, the respective candidate (1314).

Responsive to determining the syntax element corresponding to the respective candidate indicates the candidate is not reused in the current block ("NO" of 1312), video encoder 20 may omit, from the extra palette predictor list, the respective candidate (1316). Because video encoder 20 omits the respective candidate from the extra palette predictor list, video encoder 20 effectively determines the respective candidate is not included in the palette of the current block. Thus, in the example of FIG. 13, for each respective candidate in the extra palette predictor list, video encoder 20 may determine, based on the binary vector syntax element corresponding to the respective candidate in the extra palette predictor list, the respective candidate in the extra palette predictor list is not included in the palette for the current block.

The following paragraphs list several examples of this disclosure.

Example 1

A method of decoding video data, the method comprising: determining a palette predictor list that comprises one or more candidates, each respective candidate in the palette predictor list specifying a value of a different reconstructed neighboring pixel from among one or more reconstructed neighboring pixels, wherein each of the one or more reconstructed neighboring pixels is adjacent to a current block of the video data; obtaining, from a bitstream, a binary vector comprising one or more syntax elements, wherein each of the one or more syntax elements corresponds to a different candidate in the palette predictor list; for each respective candidate in the palette predictor list: if the syntax element corresponding to the respective candidate indicates that a palette for a current block of the video data includes the value specified by the respective candidate, including, in the palette, a palette entry specifying the value specified by the respective candidate; and if the syntax element corresponding to the respective candidate indicates that the palette does not include the value specified by the respective candidate, omitting, from the palette, the palette entry specifying the value specified by the respective candidate; obtaining, based on one or more additional syntax elements signaled in a bitstream, an index value for a sample of the current block; identifying a palette entry in the palette that corresponds to the index value for the sample; and determining, based on a pixel value specified by the identified palette entry, a reconstructed value of the sample.

Example 2

The method of example 1, wherein the reconstructed neighboring pixels include reconstructed neighboring pixels from a line above the current block.

Example 3

The method of examples 1 or 2, wherein the reconstructed neighboring pixels include reconstructed neighboring pixels from a column left of the current block.

Example 4

The method of example 1, wherein the reconstructed neighboring pixels include at least one of: a below-left reconstructed neighboring pixel, a left reconstructed neighboring pixel, and above-left reconstructed neighboring pixel, an above reconstructed neighboring pixel, or an above-right reconstructed neighboring pixel.

Example 5

The method of example 1, wherein the reconstructed neighboring pixels include each of: a below-left reconstructed neighboring pixel, a left reconstructed neighboring pixel, and above-left reconstructed neighboring pixel, an above reconstructed neighboring pixel, and an above-right reconstructed neighboring pixel.

Example 6

The method of any of examples 1-5, wherein generating the first palette predictor list comprises: removing one or more redundant candidates from the first palette predictor list.

Example 7

The method of any of examples 1-6, wherein generating the first palette predictor list comprises: determining, based on a metric of similarity of a first candidate in the palette predictor list and a second candidate in the palette predictor list, whether to remove the first candidate from the palette predictor list; and removing the first candidate from the palette predictor list responsive to the determination.

Example 8

The method of any of examples 1-7, wherein the one or more neighboring pixels include a plurality of neighboring pixels, and generating the first palette predictor list comprises: ranking two or more of the plurality of reconstructed neighboring pixels according to frequency of values of the plurality of the reconstructed neighboring pixels.

Example 9

The method of any of examples 1-8, wherein determining the palette predictor list comprises: truncating the palette predictor list such that a size of the palette predictor list is limited to a particular number of candidates.

Example 10

The method of any of examples 1-9, wherein in-loop filtering is not applied to the values of the one or more reconstructed neighboring pixels specified by the candidates in the palette predictor list.

Example 11

The method of any of examples 1-10, wherein the palette predictor list is a first palette predictor list and the binary vector is a first binary vector, the method further comprising: determining a second palette predictor list that comprises one or more candidates, each respective candidate in the second palette predictor list specifying a palette entry in a palette for a previously-coded block of the video data; obtaining a second binary vector from the bitstream, the second binary vector comprising one or more second binary vector syntax elements, wherein each of the one or more second binary vector syntax elements corresponds to a different candidate in the second palette predictor list; and for each respective candidate in the second palette predictor list: if the second binary vector syntax element corresponding to the respective candidate in the second palette predictor list indicates that the palette for the current block includes the palette entry specified by the respective candidate, including, in the palette for the current block, the palette entry specified by the respective candidate; and if the second binary vector syntax element corresponding to the respective candidate in the second palette predictor list indicates that the palette for the current block does not include the palette entry specified by the respective candidate, omitting, from the palette for the current block, the palette entry specified by the respective candidate.

Example 12

The method of example 11, further comprising: applying a pruning process to the first and second palette predictor lists.

Example 13

The method of example 12, wherein applying the pruning process to the first and second palette predictor lists comprises: removing, from the first palette predictor list, a particular candidate in the first palette predictor list if the particular candidate matches a candidate in the second palette predictor list.

Example 14

The method of examples 12 or 13, wherein applying the pruning process to the first and second palette predictor lists comprises: determining, based on a metric of similarity of a first candidate in the first palette predictor list and a second candidate in the second palette predictor list, whether to remove the first candidate from the first palette predictor list; and removing the first candidate from the first palette predictor list responsive to the determination.

Example 15

The method of any of examples 11-14, further comprising: obtaining, from the bitstream, syntax elements specifying one or more additional palette entries; and including, in the palette for the current block, the one or more additional palette entries.

Example 16

The method of example 15, wherein the palette entries in the palette for the current block are ordered as follows: palette entries that specify values specified by candidates in the first palette predictor list, the additional palette entries, and palette entries specified by the second palette predictor list.

Example 17

The method of example 15, wherein the palette entries in the palette for the current block are ordered as follows: palette entries that specify values specified by candidates in the first palette predictor list, palette entries specified by the second palette predictor list, and the additional palette entries.

Example 18

The method of any of examples 1-17, wherein candidates of the palette predictor list are not included in a palette predictor list used to determine a palette for a block of the video data processed after the current block.

Example 19

A method of encoding video data, the method comprising: determining a palette predictor list that comprises one or more candidates, each respective candidate in the palette predictor list specifying a value of a different reconstructed neighboring pixel from among one or more reconstructed neighboring pixels, wherein each of the one or more reconstructed neighboring pixels is adjacent to a current block of the video data; signaling, in a bitstream, a binary vector comprising one or more syntax elements, wherein each of the one or more syntax elements corresponds to a different candidate in the palette predictor list; for each respective candidate in the palette predictor list: if the syntax element corresponding to the respective candidate indicates that a palette for a current block of the video data includes the value specified by the respective candidate, the palette includes a palette entry specifying the value specified by the respective candidate; and if the syntax element corresponding to the respective candidate indicates that the palette does not include the value specified by the respective candidate, the palette omits the palette entry specifying the value specified by the respective candidate; and signaling, in the bitstream, one or more syntax elements indicating an index value for a sample of the current block, the index value corresponding to an entry in the palette.

Example 20

The method of example 19, wherein the reconstructed neighboring pixels include reconstructed neighboring pixels from a line above the current block.

Example 21

The method of examples 19 or 20, wherein the reconstructed neighboring pixels include reconstructed neighboring pixels from a column left of the current block.

Example 22

The method of example 19, wherein the reconstructed neighboring pixels include at least one of: a below-left reconstructed neighboring pixel, a left reconstructed neighboring pixel, and above-left reconstructed neighboring pixel, an above reconstructed neighboring pixel, or an above-right reconstructed neighboring pixel.

Example 23

The method of example 19, wherein the reconstructed neighboring pixels include each of: a below-left reconstructed neighboring pixel, a left reconstructed neighboring pixel, and above-left reconstructed neighboring pixel, an above reconstructed neighboring pixel, and an above-right reconstructed neighboring pixel.

Example 24

The method of any of examples 19-23, wherein generating the first palette predictor list comprises: removing one or more redundant candidates from the first palette predictor list.

Example 25

The method of any of examples 19-24, wherein generating the first palette predictor list comprises: determining, based on a metric of similarity of a first candidate in the palette predictor list and a second candidate in the palette predictor list, whether to remove the first candidate from the palette predictor list; and removing the first candidate from the palette predictor list responsive to the determination.

Example 26

The method of any of examples 19-25, wherein the one or more neighboring pixels include a plurality of neighboring pixels, and generating the first palette predictor list comprises: ranking two or more of the plurality of reconstructed neighboring pixels according to frequency of values of the plurality of the reconstructed neighboring pixels.

Example 27

The method of any of examples 19-26, wherein determining the palette predictor list comprises: truncating the palette predictor list such that a size of the palette predictor list is limited to a particular number of candidates.

Example 28

The method of any of examples 19-27, wherein in-loop filtering is not applied to the values of the one or more reconstructed neighboring pixels specified by the candidates in the palette predictor list.

Example 29

The method of any of examples 19-28, wherein the palette predictor list is a first palette predictor list and the binary vector is a first binary vector, the method further comprising: determining a second palette predictor list that comprises one or more candidates, each respective candidate in the second palette predictor list specifying a palette entry in a palette for a previously-coded block of the video data; signaling a second binary vector in the bitstream, the second binary vector comprising one or more second binary vector syntax elements, wherein each of the one or more second binary vector syntax elements corresponds to a different candidate in the second palette predictor list; and for each respective candidate in the second palette predictor list: if the second binary vector syntax element corresponding to the respective candidate in the second palette predictor list indicates that the palette for the current block includes the palette entry specified by the respective candidate, the palette for the current block includes the palette entry specified by the respective candidate; and if the second binary vector syntax element corresponding to the respective candidate in the second palette predictor list indicates that the palette for the current block does not include the palette entry specified by the respective candidate, the palette for the current block omits the palette entry specified by the respective candidate.

Example 30

The method of example 29, further comprising: applying a pruning process to the first and second palette predictor lists.

Example 31

The method of example 30, wherein applying the pruning process to the first and second palette predictor lists comprises: removing, from the first palette predictor list, a particular candidate in the first palette predictor list if the particular candidate matches a candidate in the second palette predictor list.

Example 32

The method of examples 30 or 31, wherein applying the pruning process to the first and second palette predictor lists comprises: determining, based on a metric of similarity of a first candidate in the first palette predictor list and a second candidate in the second palette predictor list, whether to remove the first candidate from the first palette predictor list; and removing the first candidate from the first palette predictor list responsive to the determination.

Example 33

The method of any of examples 29-32, further comprising: including, in the palette for the current block, the one or more additional palette entries; and signaling, in the bitstream, syntax elements specifying one or more additional palette entries.

Example 34

The method of example 33, wherein the palette entries in the palette for the current block are ordered as follows: palette entries that specify values specified by candidates in the first palette predictor list, the additional palette entries, and palette entries specified by the second palette predictor list.

Example 35

The method of example 33, wherein the palette entries in the palette for the current block are ordered as follows: palette entries that specify values specified by candidates in the first palette predictor list, palette entries specified by the second palette predictor list, and the additional palette entries.

Example 36

The method of any of examples 19-35, wherein candidates of the palette predictor list are not included in a palette predictor list used to determine a palette for a block of the video data processed after the current block.

Example 37

A device configured to decode video data, the device comprising: a memory configured to store the video data; and one or more processors configured to perform the methods of any of examples 1-18.

Example 38

A device configured to encode video data, the device comprising: a memory configured to store the video data; and one or more processors configured to perform the methods of any of examples 19-36.

Example 39

A device configured to decode video data, the device comprising means for performing the methods of any of examples 1-18.

Example 40

A device configured to encode video data, the device comprising means for performing the methods of any of examples 19-36.

Example 41

A computer-readable storage medium having instructions stored thereon that when executed cause one or more processors of a device to perform the methods of any of examples 1-18.

Example 42

A computer-readable storage medium having instructions stored thereon that when executed cause one or more processors of a device to perform the methods of any of examples 19-36.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 5) and/or video decoder 30 (FIGS. 1 and 6), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining a first palette predictor list that comprises one or more candidates, each respective candidate in the first palette predictor list specifying a respective palette entry in a palette for a previously-coded block of the video data;

determining a second palette predictor list comprising one or more additional candidates, each respective additional candidate in the second palette predictor list specifying a pixel value of a different respective reconstructed neighboring pixel from among one or more reconstructed neighboring pixels, wherein each of the one or more reconstructed neighboring pixels is in a line above or a column left of a current block of the video data, wherein the one or more additional candidates in the second palette predictor list are in addition to the one or more candidates in the first palette predictor list;

determining, based on a metric of similarity of a first candidate in the first palette predictor list and a second candidate in the second palette predictor list, whether to remove the second candidate from the second palette predictor list;

removing the second candidate from the second palette predictor list responsive to the determination;

obtaining, from a bitstream, a binary vector comprising one or more binary vector syntax elements, wherein each of the one or more binary vector syntax elements corresponds to a different candidate of the one or more additional candidates in the second palette predictor list;

after removing the second candidate from the second palette predictor list:
  for each respective candidate in the second palette predictor list, determining, based on the binary vector syntax element corresponding to the respective candidate in the second palette predictor list, whether the respective candidate in the second palette predictor list is included in a palette for the current block; and
  including, in the palette for the current block, at least one candidate from the first palette predictor list and at least one candidate from the second palette predictor list, each palette entry in the palette for the current block specifying a respective pixel value;

obtaining, based on one or more additional syntax elements signaled in the bitstream, an index value for a pixel of the current block;

identifying a palette entry in the palette that corresponds to the index value for the pixel; and determining, based on the pixel value specified by the identified palette entry, at least one reconstructed sample value of the pixel.

2. The method of claim 1, wherein the reconstructed neighboring pixels include reconstructed neighboring pixels from at least one selected from the group consisting of: a line immediately above the current block, and a column immediately left of the current block.

3. The method of claim 2, wherein the reconstructed neighboring pixels include at least one selected from the group consisting of: a below-left reconstructed neighboring pixel, a left reconstructed neighboring pixel, an above-left reconstructed neighboring pixel, an above reconstructed neighboring pixel, or an above-right reconstructed neighboring pixel.

4. The method of claim 1, wherein determining the second palette predictor list comprises:
  removing one or more redundant candidates from the second palette predictor list.

5. The method of claim 1, wherein the one or more reconstructed neighboring pixels include a plurality of neighboring pixels, and determining the second palette predictor list comprises:

ranking, within the second palette predictor list, two or more of the plurality of reconstructed neighboring pixels according to frequency of values of the plurality of the reconstructed neighboring pixels.

6. The method of claim 1, wherein determining the second palette predictor list comprises:
  truncating the second palette predictor list such that a size of the second palette predictor list is limited to a particular number of candidates.

7. The method of claim 1, further comprising applying in-loop filtering to the one or more reconstructed neighboring pixels after determining the second palette predictor list.

8. The method of claim 1, wherein the binary vector is a first binary vector, the method further comprising:
  obtaining, from the bitstream, a second binary vector, the second binary vector comprising one or more additional binary vector syntax elements, wherein each of the one or more additional binary vector syntax elements in the second binary vector corresponds to a different candidate in the first palette predictor list; and
  for each respective candidate in the first palette predictor list, determining, based on the additional binary vector syntax element in the second binary vector corresponding to the respective candidate in the first palette predictor list, whether the respective candidate in the first palette predictor list is not included in the palette for the current block.

9. The method of claim 1, further comprising:
  applying a pruning process that removes, from the second palette predictor list, a particular candidate in the second palette predictor list if the particular candidate matches a candidate in the first palette predictor list.

10. The method of claim 1, further comprising:
  obtaining, from the bitstream, syntax elements specifying one or more additional palette entries; and
  including, in the palette for the current block, the one or more additional palette entries,
  wherein the palette entries in the palette for the current block are ordered as follows: palette entries specifying candidates in the second palette predictor list, palette entries specifying candidates in the first palette predictor list, and the additional palette entries.

11. The method of claim 1, further comprising:
  obtaining, from the bitstream, syntax elements specifying one or more additional palette entries; and
  including, in the palette for the current block, the one or more additional palette entries,
  wherein the palette entries in the palette for the current block are ordered as follows: palette entries specifying candidates in the first palette predictor list, palette entries specifying candidates in the second palette predictor list, and the additional palette entries.

12. The method of claim 1, wherein candidates of the second palette predictor list are not included in a palette predictor list used to determine a palette for a block of the video data processed next in decoding order after the current block.

13. A method of encoding video data, the method comprising:
  determining a first palette predictor list that comprises one or more candidates, each respective candidate in the first palette predictor list specifying a respective palette entry in a palette for a previously-coded block of the video data;
  determining a second palette predictor list comprising one or more additional candidates, each respective additional candidate in the second palette predictor list specifying a pixel value of a different respective reconstructed neighboring pixel from among one or more reconstructed neighboring pixels, wherein each of the one or more reconstructed neighboring pixels is in a line above or a column left of a current block of the video data, wherein the one or more additional candidates in the second palette predictor list are in addition to the one or more candidates in the first palette predictor list;

determining, based on a metric of similarity of a first candidate in the first palette predictor list and a second candidate in the second palette predictor list, whether to remove the second candidate from the second palette predictor list;

removing the second candidate from the second palette predictor list responsive to the determination;

after removing the second candidate from the second palette predictor list:

including, in a bitstream, a binary vector comprising one or more binary vector syntax elements, wherein each of the one or more binary vector syntax elements corresponds to a different candidate of the one or more additional candidates in the second palette predictor list and indicates whether the corresponding candidate in the second palette predictor list is included in a palette for the current block; and including, in the palette for the current block, at least one candidate from the first palette predictor list and at least one candidate from the second palette predictor list, each palette entry in the palette for the current block specifying a respective pixel value; and signaling, in the bitstream, one or more additional syntax elements indicating an index value for a pixel of the current block, the index value corresponding to an entry in the palette.

14. The method of claim 13, wherein the reconstructed neighboring pixels include reconstructed neighboring pixels from at least one selected from the group consisting of: a line immediately above the current block, and a column immediately left of the current block.

15. The method of claim 13, wherein the reconstructed neighboring pixels include at least one selected from the group consisting of: a below-left reconstructed neighboring pixel, a left reconstructed neighboring pixel, an above-left reconstructed neighboring pixel, an above reconstructed neighboring pixel, or an above-right reconstructed neighboring pixel.

16. The method of claim 13, wherein the one or more neighboring pixels include a plurality of neighboring pixels, and generating the second palette predictor list comprises:

ranking, within the second palette predictor list, two or more of the plurality of reconstructed neighboring pixels according to frequency of values of the plurality of the reconstructed neighboring pixels.

17. The method of claim 13, wherein the binary vector is a first binary vector, the method further comprising:

signaling a second binary vector in the bitstream, the second binary vector comprising one or more additional binary vector syntax elements, wherein each of the one or more additional binary vector syntax elements in the second binary vector corresponds to a different candidate in the first palette predictor list and indicates whether the corresponding candidate in the first palette predictor list is included in the palette for the current block.

18. The method of claim 13, further comprising:

applying a pruning process that removes, from the second palette predictor list, a particular candidate in the second palette predictor list if the particular candidate matches a candidate in the first palette predictor list.

19. A device configured to decode video data, the device comprising:

a memory configured to store the video data; and one or more processors configured to:

determine a first palette predictor list that comprises one or more candidates, each respective candidate in the first palette predictor list specifying a respective palette entry in a palette for a previously-coded block of the video data;

determine a second palette predictor list comprising one or more additional candidates, each respective additional candidate in the second palette predictor list specifying a pixel value of a different respective reconstructed neighboring pixel from among one or more reconstructed neighboring pixels, wherein each of the one or more reconstructed neighboring pixels is in a line above or a column left of a current block of the video data, wherein the one or more additional candidates in the second palette predictor list are in addition to the one or more candidates in the first palette predictor list;

determine, based on a metric of similarity of a first candidate in the first palette predictor list and a second candidate in the second palette predictor list, whether to remove the second candidate from the second palette predictor list;

remove the second candidate from the second palette predictor list responsive to the determination obtaining, from a bitstream, a binary vector comprising one or more binary vector syntax elements, wherein each of the one or more binary vector syntax elements corresponds to a different candidate of the one or more additional candidates in the second palette predictor list;

after removing the second candidate from the second palette predictor list:

for each respective candidate in the second palette predictor list, determining, based on the binary vector syntax element corresponding to the respective candidate in the second palette predictor list, whether the respective candidate in the second palette predictor list is included in a palette for the current block; and include, in the palette for the current block, at least one candidate from the first palette predictor list and at least one candidate from the second palette predictor list;

obtain, based on one or more additional syntax elements signaled in the bitstream, an index value for a pixel of the current block;

identify a palette entry in the palette that corresponds to the index value for the pixel; and determine, based on the pixel value specified by the identified palette entry, at least one reconstructed sample value of the pixel.

20. The device of claim 19, wherein the reconstructed neighboring pixels include reconstructed neighboring pixels from at least one selected from the group consisting of: a line immediately above the current block, and a column immediately left of the current block.

21. The device of claim 19, wherein the binary vector is a first binary vector, the one or more processors further configured to:

obtain, from the bitstream, a second binary vector, the second binary vector comprising one or more additional binary vector syntax elements, wherein each of the one or more additional binary vector syntax elements in the second binary vector corresponds to a different candidate in the first palette predictor list; and for each respective candidate in the second palette predictor list, determine, based on the additional binary vector syntax element in the second binary vector corresponding to the respective candidate in the first palette predictor list, whether the respective candidate in the first palette predictor list is included in the palette for the current block.

22. The device of claim 19, wherein the device comprises at least one selected from the group consisting of:
an integrated circuit;
a microprocessor; or
a wireless communication device.

23. The device of claim 19, further comprising at least one selected from the group consisting of: a display configured to display the decoded video data, or a camera configured to capture the video data.

24. A device configured to decode video data, the device comprising:

means for determining a first palette predictor list that comprises one or more candidates, each respective candidate in the first palette predictor list specifying a respective palette entry in a palette for a previously-coded block of the video data;

means for determining a second palette predictor list comprising one or more additional candidates, each respective additional candidate in the second palette predictor list specifying a pixel value of a different respective reconstructed neighboring pixel from among one or more reconstructed neighboring pixels, wherein each of the one or more reconstructed neighboring pixels is in a line above or a column left of a current block of the video data, wherein the one or more additional candidates in the second palette predictor list are in addition to the one or more candidates in the first palette predictor list;

means for determining, based on a metric of similarity of a first candidate in the first palette predictor list and a second candidate in the second palette predictor list, whether to remove the second candidate from the second palette predictor list;

means for removing the second candidate from the second palette predictor list responsive to the determination;

means for obtaining, from a bitstream, a binary vector comprising one or more binary vector syntax elements, wherein each of the one or more binary vector syntax elements corresponds to a different candidate of the one or more additional candidates in the second palette predictor list;

means for determining, after removing the second candidate from the second palette predictor list, for each respective candidate in the second palette predictor list, based on the binary vector syntax element corresponding to the respective candidate in the second palette predictor list, whether the respective candidate in the second palette predictor list is included in a palette for the current block;

means for including, in the palette for the current block, after removing the second candidate from the second palette predictor list, at least one candidate from the first palette predictor list and at least one candidate from the second palette predictor list, each palette entry in the palette for the current block specifying a respective pixel value;

means for obtaining, based on one or more additional syntax elements signaled in the bitstream, an index value for a pixel of the current block;

means for identifying a palette entry in the palette that corresponds to the index value for the pixel; and means for determining, based on the pixel value specified by the identified palette entry, at least one reconstructed sample value of the pixel.

* * * * *